United States Patent
Lindner et al.

(10) Patent No.: US 11,178,712 B2
(45) Date of Patent: Nov. 16, 2021

(54) SYSTEMS AND METHODS TO ESTABLISH SECURE VEHICLE NETWORKS

(71) Applicant: Deere & Company, Moline, IL (US)

(72) Inventors: David Lindner, Fargo, ND (US); Jason Malarkey, Fargo, ND (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/445,704

(22) Filed: Jun. 19, 2019

(65) Prior Publication Data
US 2020/0107384 A1   Apr. 2, 2020

Related U.S. Application Data

(60) Provisional application No. 62/740,070, filed on Oct. 2, 2018.

(51) Int. Cl.
*H04W 76/15* (2018.01)
*H04W 4/46* (2018.01)

(52) U.S. Cl.
CPC ............ *H04W 76/15* (2018.02); *H04W 4/46* (2018.02)

(58) Field of Classification Search
CPC ... H04W 76/15; H04W 4/46; H04W 56/0015; G05D 2201/0201; G05D 1/0295; A01B 76/00; A01B 69/008; B60R 16/023; H04L 12/28; H04L 67/12; H04L 67/00
See application file for complete search history.

(56) References Cited

U.S. PATENT DOCUMENTS

| | | |
|---|---|---|
| 6,240,188 B1 | 5/2001 | Dondeti et al. |
| 6,684,331 B1 | 1/2004 | Srivastava |
| 7,079,020 B2 | 7/2006 | Stilp |
| 7,353,541 B1 | 4/2008 | Ishibashi et al. |
| 8,015,604 B1 | 9/2011 | Tidwell et al. |
| 8,499,155 B2 | 7/2013 | Kherani et al. |
| 8,627,073 B2 | 1/2014 | Kherani et al. |
| 2004/0212497 A1* | 10/2004 | Stilp ............ G08B 25/10 340/539.17 |

(Continued)

FOREIGN PATENT DOCUMENTS

CN    101262333 A    9/2008

OTHER PUBLICATIONS

Extended European Search Report dated Mar. 17, 2020 issued in corresponding European Patent Application No. 19199055.5-1004.

(Continued)

*Primary Examiner* — Dong-Chang Shiue
(74) *Attorney, Agent, or Firm* — Harness, Dickey & Pierce, P.L.C.

(57) ABSTRACT

An embodiment of the invention relates to a method of establishing a secure vehicle network including a plurality of nodes, each of the plurality of nodes including a memory storing a leader/follower field, the method includes establishing a communication path between a first node with a value corresponding to "leader" in the leader/follower field and a second node with a value corresponding to leader in the leader/follower field; and communicating between the first node and the second node over the communication path to establish the secure vehicle network by electing one of the first node and the second node to assign a value corresponding to "follower" to the leader/follower field.

16 Claims, 19 Drawing Sheets

(56) References Cited

U.S. PATENT DOCUMENTS

| | | |
|---|---|---|
| 2005/0094574 A1 | 5/2005 | Han et al. |
| 2010/0098102 A1* | 4/2010 | Banks ............... H04W 52/0235 |
| | | 370/406 |
| 2013/0045678 A1* | 2/2013 | Lee ......................... H04W 4/80 |
| | | 455/39 |
| 2013/0046841 A1* | 2/2013 | Park ...................... H04W 8/186 |
| | | 709/206 |
| 2013/0212659 A1 | 8/2013 | Maher et al. |
| 2014/0114497 A1 | 4/2014 | Miyake |
| 2014/0136187 A1* | 5/2014 | Wolverton .............. G10L 15/22 |
| | | 704/9 |
| 2015/0006633 A1 | 1/2015 | Vandwalle et al. |
| 2017/0024453 A1 | 1/2017 | Raja et al. |
| 2017/0303187 A1 | 10/2017 | Crouthamel et al. |

OTHER PUBLICATIONS

J. Villadangos et al. "Efficient leader election in complete networks" IEEE Computer Society p. 1-8.

L. Arantes et al. "Eventual Leader Election in Evolving Movile Networks" Principles of Distributed Systems, 2013; p. 1-15.

\* cited by examiner

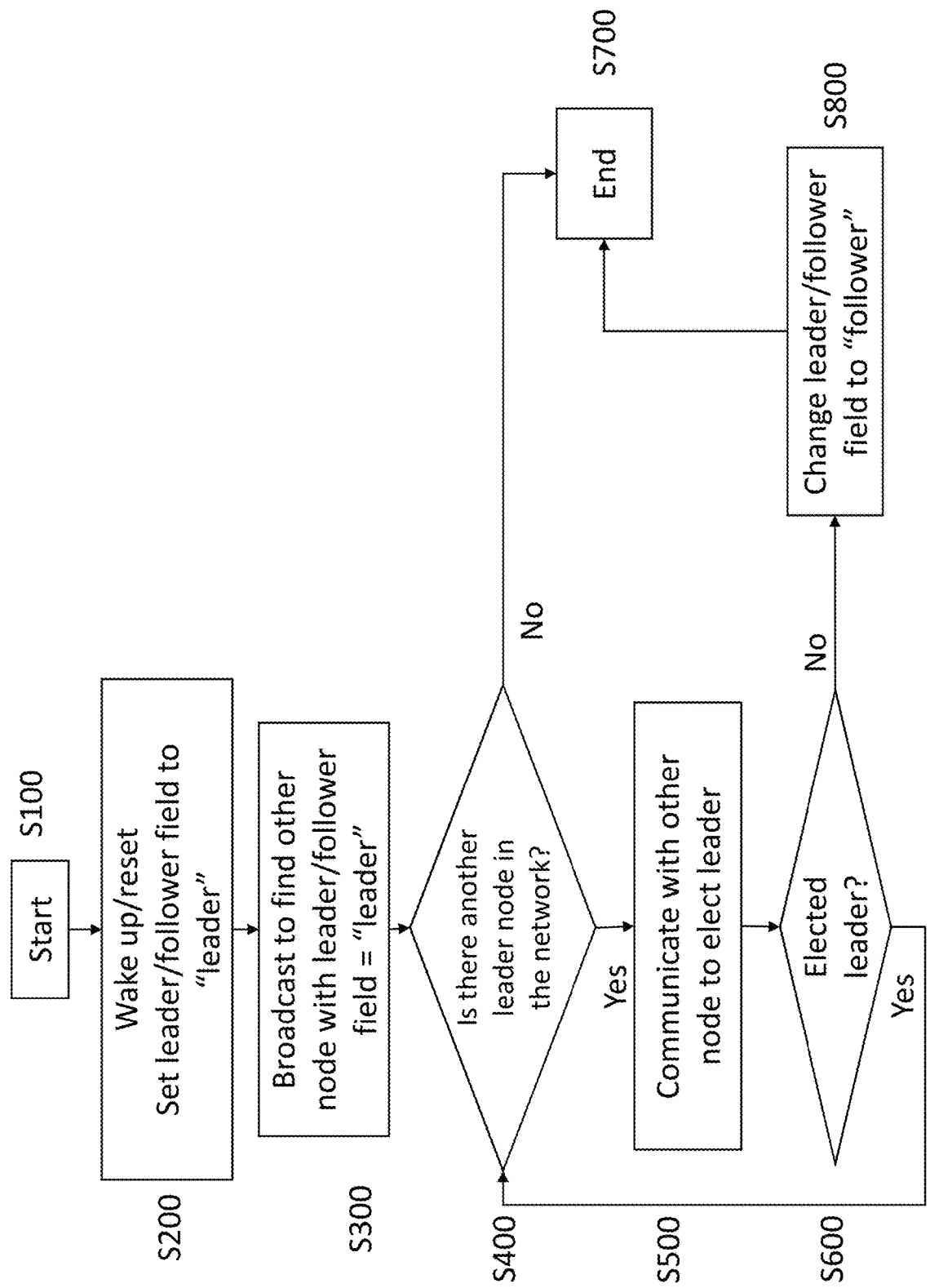

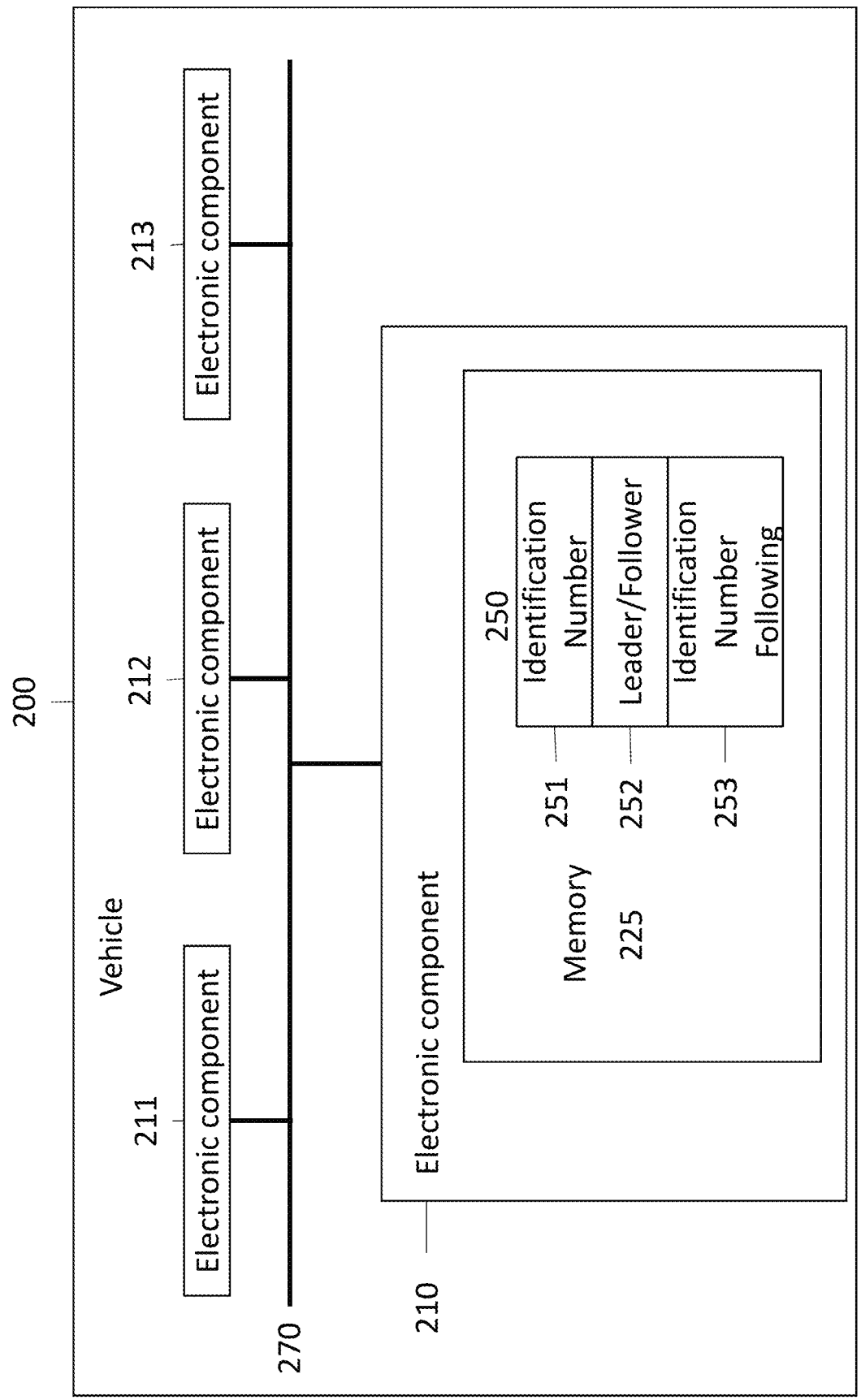

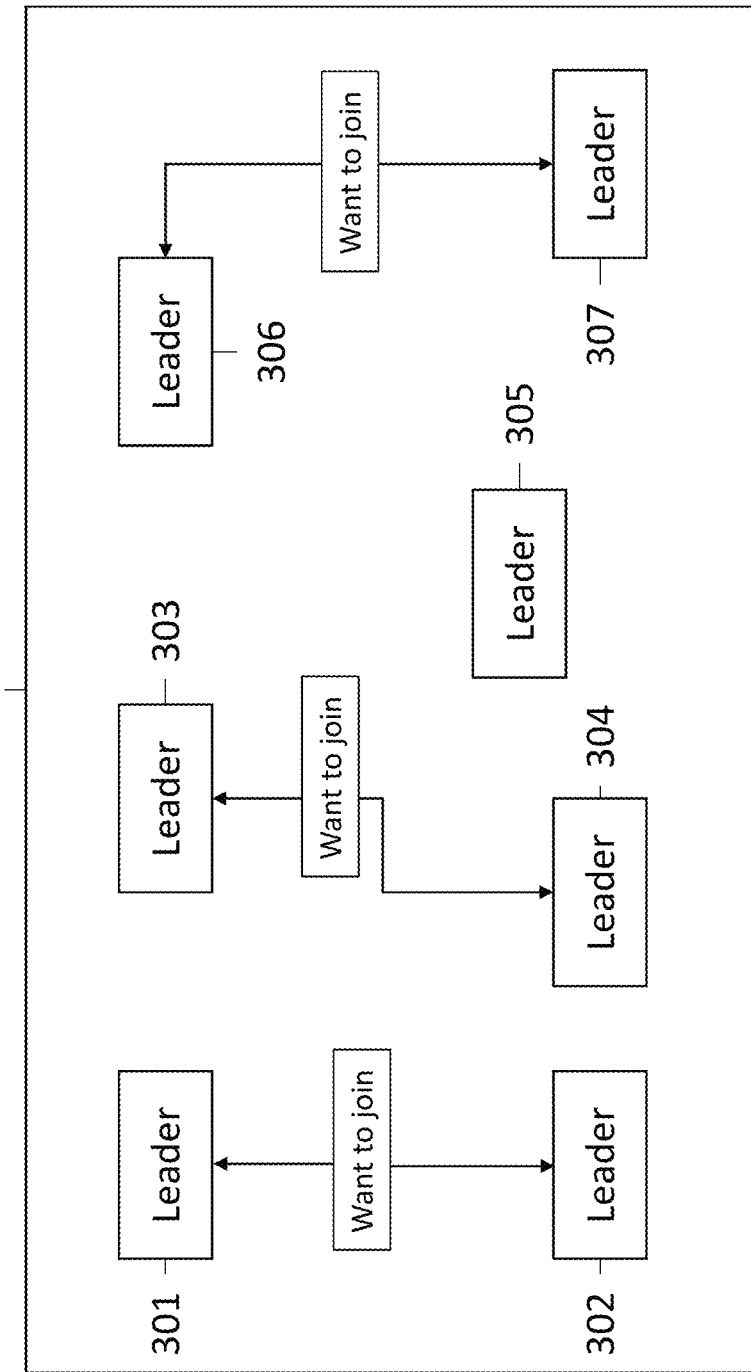

FIG. 3(g)

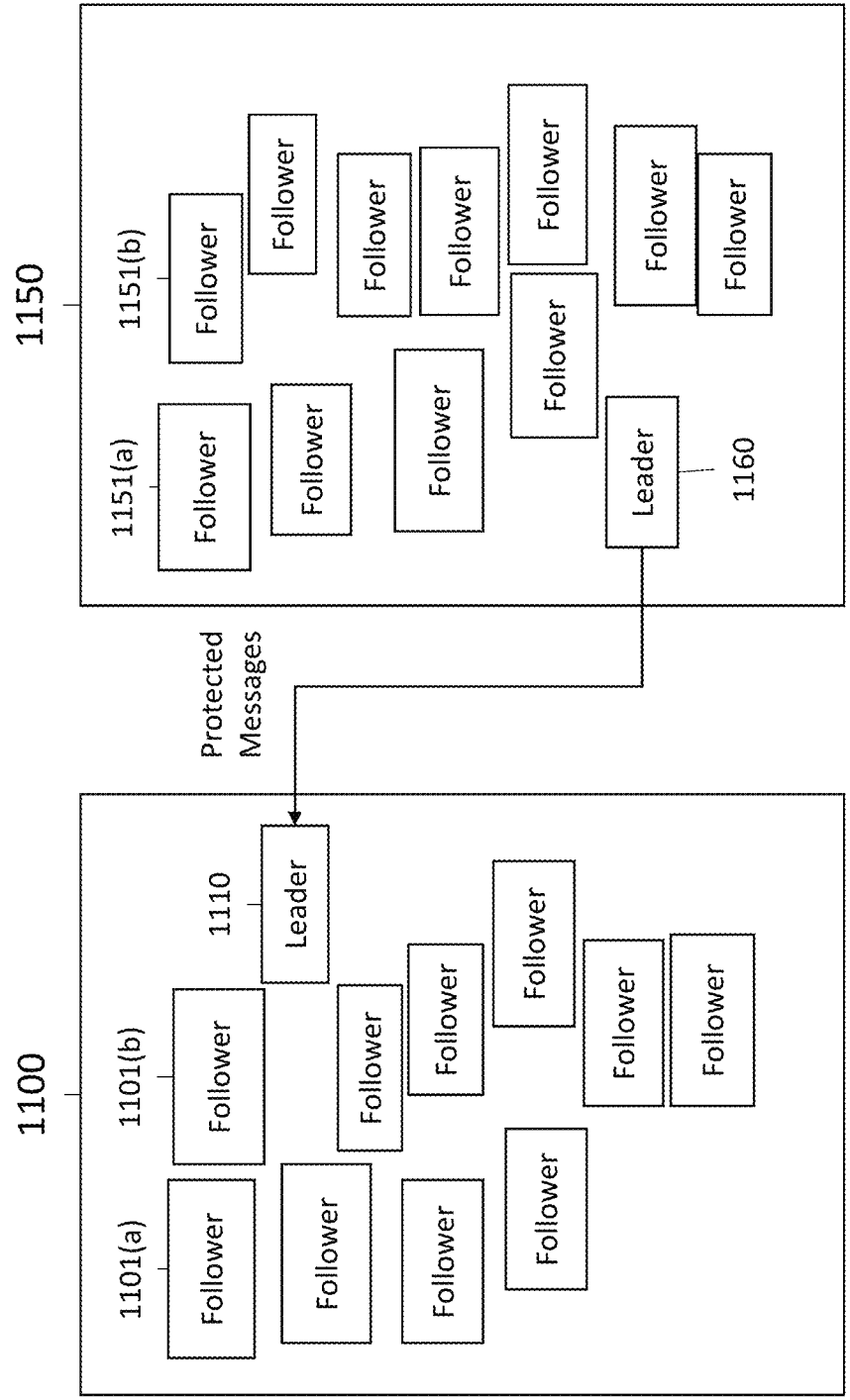

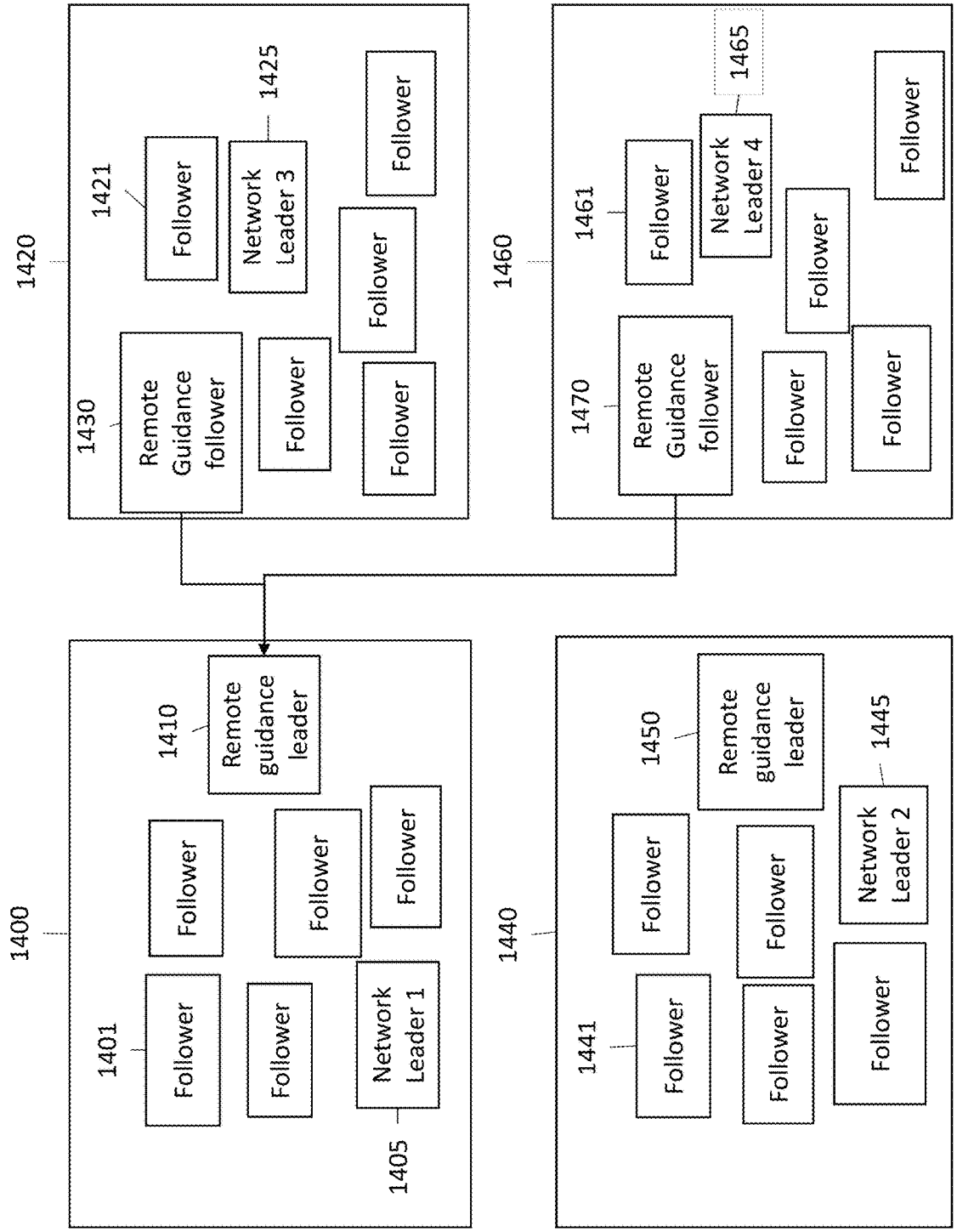

SYSTEMS AND METHODS TO ESTABLISH SECURE VEHICLE NETWORKS

CROSS-REFERENCE TO RELATED APPLICATIONS

This non-provisional application claims the benefit of U.S. Provisional Application No. 62/740,070, filed on Oct. 2, 2018, the entire contents of which is incorporated by reference in its entirety.

FIELD

Example embodiments relate to systems and methods to establish secure communication networks, and more specifically for intra-vehicle communication for components within a vehicle, and inter-vehicle communications amongst vehicles, for example, amongst agricultural vehicles.

BACKGROUND

A vehicle, such as an agricultural vehicle as in a tractor, combine, implement or a construction vehicle, as in a loader or an excavator, includes a plurality of electronic components that are required to communicate with each other.

Example electronic components can include engine controllers, transmission controllers, telematics boxes, displays, on-vehicle servers, wireless communication controllers, satellite antenna, steering controllers, window controllers, implement hitch controllers, generators/inverters, brake control modules, seat controllers, etc. A vehicle can have more than one instance of each of the above electronic components. When the components communicate with each other within a vehicle, each such component will be a node within a communication network. An example vehicle might be a planter that can plant multiple rows of seeds at a time. Each row on the planter can have a number of electronic components performing similar functions. Each such electronic component must communicate, and will correspond to a node within a communication network. One node on the planter can receive groundspeed from a tractor pulling the planter, and broadcast the groundspeed to other nodes of the planter so that each of the multiple rows can determine how fast to dispense seeds.

Establishing secure communication networks for components within the vehicle and amongst separate vehicles pose a plethora of constraints. In known systems within a vehicle, the time to establish a secure network is constrained by bandwidth of a communications bus, along with the time of verification of additional nodes. Nodes join the network in a serial fashion, broadcasting the desire to join the network.

Further, nodes execute these verifications with limited resources. Computation is delegated, for example, to dedicated security hardware, such as a dedicated security core of an embedded microcontroller, or a hardware security chip external to the microcontroller. Similarly, vehicle data transfer rates, for example over a Controller Area Network (CAN) bus, are a limiting factor whereas non-automotive communication might instead rely on a faster network type. Notably, CAN buses are broadcast networks and therefore vehicle nodes may not initially have private communication means to aid in establishing a secure vehicle network.

As every node is required to communicate with all nodes to verify all other nodes before establishing a secure network, time and resources may be high. Thus, there is a need for a protocol to establish a secure network within a vehicle and among separate vehicles with reduced time and reduced resources.

SUMMARY

At least one example embodiment provides a method of establishing a secure vehicle network including a plurality of nodes, each of the plurality of nodes including a memory storing a leader/follower field, the method including establishing a communication path from a first node with a value corresponding to "leader" in the leader/follower field to a second node with a value corresponding to "leader" in the leader/follower field, the first node having first information, and communicating from the first node to the second node over the communication path to establish the secure vehicle network by (i) receiving second information from the second node, and (ii) electing the first node to maintain the value corresponding to "leader" in the leader/follower field based on the second information received from the second node.

BRIEF DESCRIPTION OF THE DRAWINGS

Example embodiments will be more clearly understood from the following detailed description taken in conjunction with the accompanying drawings. FIGS. 1-9 represent non-limiting, example embodiments as described herein.

FIG. 1 is a flowchart describing a method of establishing a secure vehicle network for intra-vehicle communication, according to some example embodiments;

FIG. 2 is a block representation of a vehicle, according to some example embodiments;

FIGS. 3(a)-3(g) are representative drawings illustrating the establishment of secure vehicle networks on a vehicle for intra-vehicle communication, according to some example embodiments;

FIG. 5 is a table representing the number of secure networks established through each iteration, according to some example embodiments;

FIGS. 6(a)-6(c) are representative drawings illustrating the establishment of secure vehicle networks amongst vehicles for inter-vehicle communication, according to some example embodiments;

FIGS. 7(a)-7(b) are representative drawings illustrating the establishment of secure vehicle networks amongst vehicles for inter-vehicle communication, according to some example embodiments;

FIG. 8 shows a example agricultural vehicles according to some example embodiments; and FIG. 9 is a representative drawing illustrating a system including a satellite and a vehicle, according to some example embodiments.

DETAILED DESCRIPTION

Figure 3B:
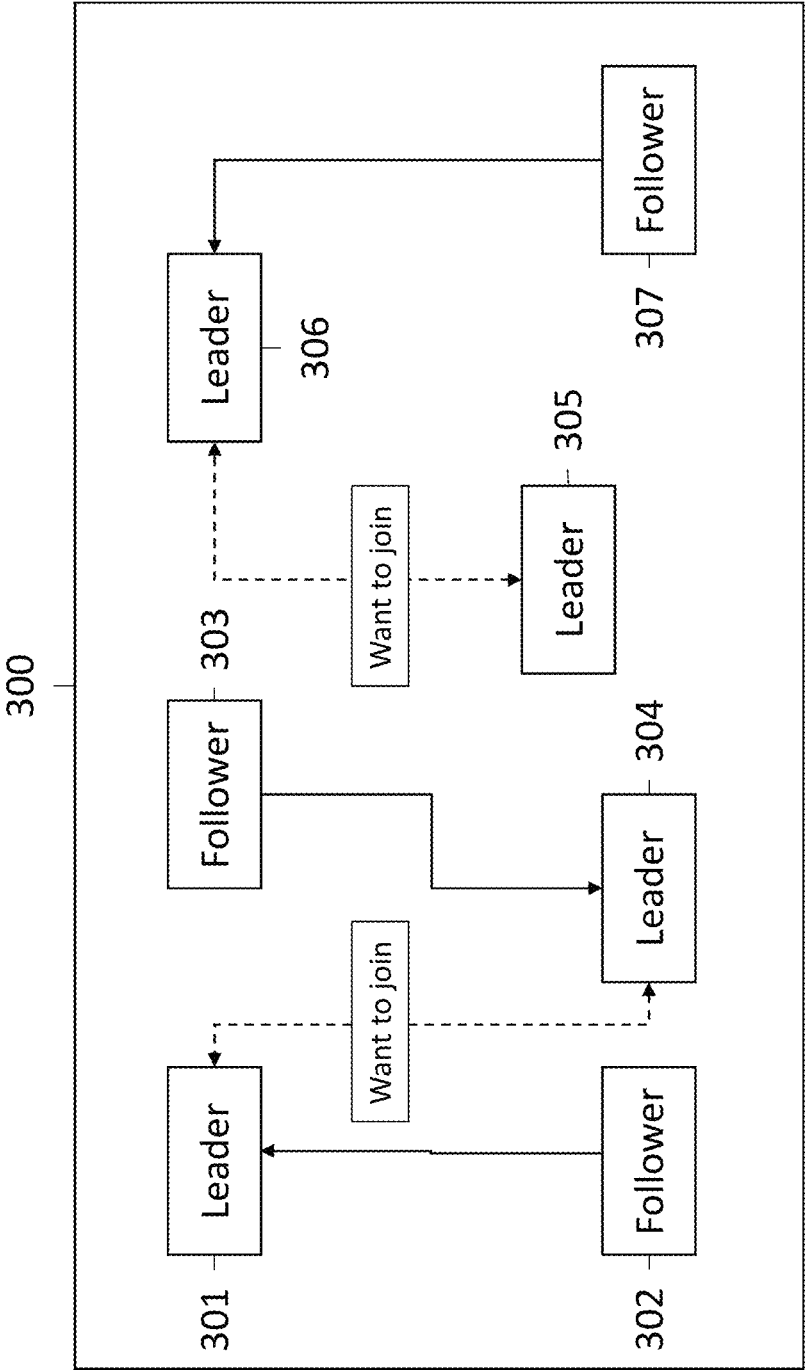
Figure 3C:
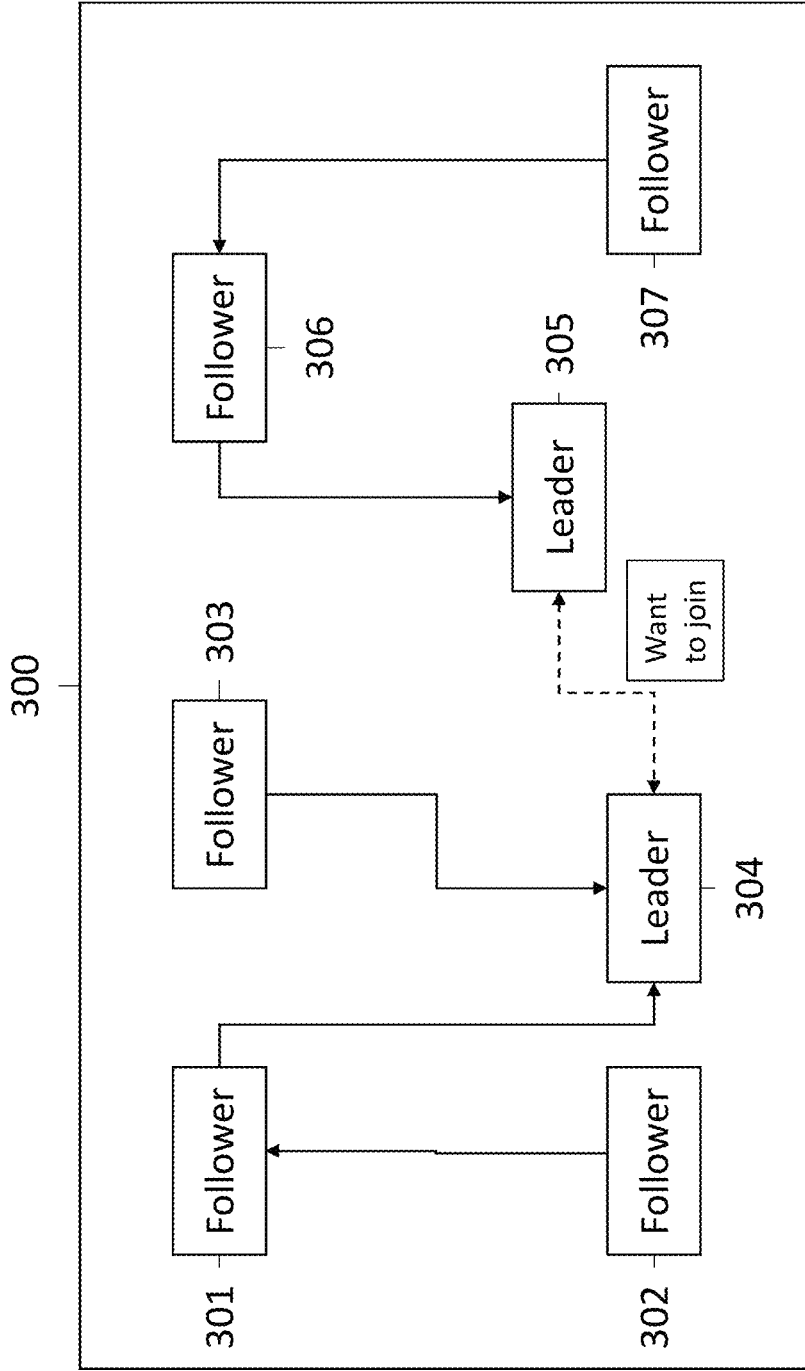

Example embodiments relate to systems and methods to establish secure communication networks, and more specifically for intra-vehicle communication for components within a vehicle, and inter-vehicle communications amongst vehicles, for example, amongst agricultural vehicles.

In response to the first node not being elected leader based on the second information received from the second node, the method further includes assigning a value corresponding to "follower" in the leader/follower field of the first node.

In response to the first node not being elected leader based on the second information received from the second node, the method further includes assigning a value in an identification number following field in the memory of the first node to correspond to an identifier of the second node.

The method may further include, in response to the first node being elected leader, establishing a communication path from the first node to a third node with a value corresponding to "leader" in a leader/follower field of a memory of the third node, and communicating from the first node to the third node over the communication path to establish the secure vehicle network by (i) receiving third information from the third node, and (ii) electing the first node to assign a value corresponding to "follower" to the leader/follower field based on the third information received from the third node.

The electing includes electing the first node to assign a value corresponding to "follower" to the leader/follower field based on an identifier of the first node and an identifier of the second node.

The method may further include, in the first node, setting a value corresponding to "leader" in the leader/follower field in response to a reset command performed by the first node.

The method may further include, in the first node, setting a value corresponding to "leader" in the leader/follower field in response to a wake-up command performed by the first node.

The communicating from the first node to the second node includes communicating over a bus, the bus including at least one of a CAN bus, a wireless bus, a LIN bus, a FlexRay bus, a MOST bus, or an Ethernet bus.

The establishing the communication path from the first node to the second node includes, the first node broadcasting a message over the bus, the message including a statement of a desire to join other nodes, and wherein the first node is configured to receive a message from the second node that is broadcast over the bus, the message including a statement of a desire to join other nodes.

The first node of the plurality of nodes corresponds to an electronic component, and the electronic component includes at least one of a body controller, an engine controller, a transmission controller, a telematics box, a display, an on-vehicle server, a wireless communication controller, a satellite antenna, a steering controller, a window controller, an implement hitch controller, a generator/inverter, a brake controller, or a seat controller.

The first node of the plurality of nodes corresponds to an electronic component of an agricultural vehicle, a mining vehicle, or of a construction vehicle, the agricultural vehicle including one of a tractor, combine, implement, the construction vehicle including one of a loader or an excavator.

The method may further include changing a logical network topology of the vehicle secure network by selecting one of the plurality of nodes having a value corresponding to "follower" in the leader/follower field, and assigning a value in the identification number following field of the selected node to a value corresponding to the identification number corresponding to the one of the plurality of nodes.

At least one example embodiment provides a method of communicating among a plurality of vehicles, at least one of the plurality of vehicles including at least one electronic component, the at least one electronic component including a memory storing a leader/follower field, the method includes sending a first protected message from an electronic component in a first vehicle to an electronic component in a second vehicle, the leader/follower field of the at least one of the electronic components of the first vehicle having a value corresponding to "network leader", and receiving a second protected message from the second vehicle.

The first vehicle may include a combine, and the second vehicle includes a tractor with a grain cart, and the first vehicle performs a message authentication of each communication from the second vehicle.

The first vehicle may communicate to the second vehicle over a wireless communication path.

A first electronic component of a first one of the plurality of vehicles includes a value corresponding to "remote guidance leader" in the leader/follower field, and a second electronic component of a second one of the plurality of electronic vehicles has a value corresponding to "remote guidance follower" in the leader/follower field, and the first electronic component sends a message to the second electronic components, the message including information on how the second one of the plurality of electronic components should be driven.

The first vehicle includes a tractor, and the second vehicle includes a planter having a plurality of rows, each of the plurality of rows including a respective one of the electronic components, and the first electronic component in the first vehicle having a value corresponding to "remote guidance leader" in the leader/follower field is configured to broadcast a speed of the tractor, and the second electronic component in the second vehicle having a value corresponding to "remote guidance follower" in the leader/follower field is configured to broadcast the speed of the tractor to the other electronic components in the second vehicle.

At least one example embodiment provides an agricultural vehicle including at least one electronic component configured to communicate with other electronic components over a communication bus, the at least one electronic component including a memory configured to (i) store an identification number, (ii) store a leader/follower field indicating whether the electronic component is a leader or a follower, and (ii) store an identification number following field indicating an identification number associated with a node to which the electronic component delegates joining vehicle secure communication networks, a node having a value of "leader" in the leader/follower field configured to join vehicle secure communication networks on behalf of other electronic components having a value of "follower" in the leader/follower field, a value of the identification number following field in the other nodes having a value of "follower" in the leader/follower field corresponding to a value of the identification number stored in the identification number field of the node having a value of "leader" in the leader/follower field.

A first electronic component having a value corresponding to "leader" in the leader/follower field is configured to communicate to a second electronic component having a value corresponding to "leader" in the leader/follower field, the first electronic component is configured to communicate to the second electronic component to elect the first electronic component to change the value in the leader/follower field to "follower."

At least one of the plurality of electronic components is configured to perform one of the methods.

At least one of the plurality of electronic components having a value corresponding to "follower" in the leader/follower field does not broadcast a message to other nodes indicating a desire to join a vehicle secure network.

A vehicle, for example an agricultural vehicle, includes a plurality of machinery, such as tractor and other attached agricultural implements. Such implements may include cultivators, rotors, spreaders, etc.; however, inventive concepts are not limited thereto.

The tractor and the other implements includes at least one electronic component. These electronic components communicate with each other through some communication path, e.g. some physical communication path. The communication path is used in establishing the secure vehicle network. For example, individual electronic components may communicate over a communication path including a CAN bus or some other physical bus, for example some other bus over twisted pair communication and/or RS/232 communication; however, inventive concepts are not limited thereto. For example, individual electronic components may communicate over a communication path that is wireless. Further, individual electronic components can communicate over a communication path including a Local Interconnected Network (LIN) bus, or over a communication path including an Ethernet bus; inventive concepts are not limited thereto.

According to the example embodiments described herein, the communication among the electronic components is made secure. Individual components may join the secure vehicle network. A system of individual electronic components communicating over the secure vehicle network can be established according to example embodiments.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), Digital Signal Processors (DSPs), Application-Specific-Integrated-Circuits (ASICs), Field Programmable Gate Arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group)

that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one embodiment of the invention relates to a non-transitory transitory computer-readable storage medium comprising electronically readable control information stored thereon, configured such that when the storage medium is used in a controller, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above-mentioned embodiments and/or to perform the method of any of the above-mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

As referred to herein, a vehicle may network include, for example, a plurality of individual nodes within a vehicle, such as an automotive vehicle and/or an agricultural vehicle and/or a mining vehicle. Non-limiting example vehicles may include tractors, planters, sprayers, bulldozers, backhoe loaders, forklifts, steam rollers, cranes, haul truck, underground graders, rock breakers, etc.; inventive concepts are not limited thereto. A secure network may include nodes that communicate securely.

In accordance with example embodiments, each node will be designated as either a "follower node" or a "leader node." A follower node is a node on a secure network that delegates to a leader node the action to join other secure networks. A leader node is a node with zero or more follower nodes, authorized by the follower nodes to join other secure networks on behalf of the follower nodes. As described below in more detail, by distinguishing between "leader nodes" and "follower nodes" with specific roles, the establishment of secure vehicle networks will be efficient.

Furthermore, as referred to herein, a network leader node is a leader node that does not delegate the action to join other secure networks.

FIG. 1 is a flowchart describing a method of establishing a secure vehicle network, for example for intra-vehicle communication, according to some example embodiments.

Herein, a vehicle, such as an agricultural vehicle, has a plurality of electronic control units, e.g. electronic components. These electronic control units/components will be nodes within the secure vehicle network. Each electronic component includes a memory that stores a table 250, to be described in more detail below with reference to FIG. 2. The table 250 includes a field, herein described as a "leader/follower" field, which indicates whether the corresponding node is a leader or a follower.

Referring to FIG. 1, at step S100, the method of establishing a secure vehicle network begins.

At step S200, there are more electronic components (nodes) that are to join the secure vehicle network. As an example, a vehicle can be started up or powered on, and thus each electronic component will be turned on. Thus, a vehicle network needs to be created so that each such component/node can communicate. Electronic components that have been woken up, or have been reset, will set the "leader/follower" field to "leader."

At step S300, the first electronic component broadcasts a message, for example over a CAN bus within the vehicle. The broadcasted message will indicate that the electronic component is a leader, and is looking for another electronic component that is also a leader.

For example, by following CAN protocol J1939, there is a feature called "address claim." Nodes on the CAN bus can request the "source address" of other nodes on the bus. Nodes can thus discover one another by leveraging address claims.

Nodes with a value of "leader" in the leader/follower field may communicate with other nodes with a value of "leader" in the leader/follower field. A request message directed at another node, and a confirmation message from the other node, may result in a "handshake" where one node verifies another. This handshake may establish a secure communication.

In step S400, a determination is made as to whether there is another node in the network having a value corresponding to "leader" in the leader/follower field.

If, upon broadcasting the message, there are no other leader nodes in the network, the electronic component ends the method in step S700.

However, if there is another, second, electronic component with a "leader" value in the leader/follower field, then at step S500, the first electronic component and the second electronic component engage in a decision protocol/election, to be described in more detail below, to decide which of the first electronic component and the second electronic component will maintain the role of the leader, and keep a value corresponding to "leader" in the leader/follower field. As described below in more detail, because only leader nodes are authorized by the follower nodes to join other secure networks on behalf of the follower nodes, the establishment of secure vehicle networks will be efficient.

In step S600, if, as an outcome of the election, the first electronic component is elected leader, the first electronic component, the method returns to step S400.

However, if, as an outcome of the election, the first electronic component is not elected leader, the first electronic component may update/change the leader/follower field to correspond to "follower" in step S800.

Upon changing the leader/follower field to correspond to "follower," the method may end in step S700. Because nodes communicate and handshake securely, a secure vehicle network will be established.

The example method described with reference to FIG. 1 is not limited thereto. One of ordinary skill in the art may modify the method of FIG. 1 in various ways. For example, during the communication, a comparison of a digital certificate may be performed. Communication may not be performed to other nodes that do not satisfy requirements of the digital certificate.

FIG. 2 is an illustration of a vehicle 200, according to some example embodiments.

Referring to FIG. 2, the vehicle 200 includes a first electronic component 210 along with a plurality of other electronic components 211, 212, 213, etc. There is a communication bus 270 connecting each electronic component. The communication bus 270 may be a CAN bus. As mentioned above, the first electronic component 210 may be or include a body controller, an engine controller, a transmission controller, a telematics box, etc.; however, inventive concepts are not limited thereto. The first electronic component 210 includes hardware including a memory 225 that contains a table 250. The table 250 may be contiguous within the memory 225, or may be non-contiguous; inventive concepts are not limited thereto.

The table 250 stored in the memory 225 of the electronic component 210 includes a field containing an identification number 251 or another identifier of the electronic component 210. The identification number 251 of the electronic component includes an identifier for the electronic component. For example, the identification number 251 may be a unique identifier, unique to the specific electronic component. For example, the identification number 251 may correspond to a hardware media access control physical address associated with the specific electronic component; however, inventive concepts are not limited thereto, and the identification number 251 may correspond to any other identifier, or any other unique identifier. For example, the identification number 251 may correspond to a serial number associated with the specific electronic component. For example, the identification number 251 may be a numeric string, an alphanumeric string, or a alphabetical string. As a non-limiting example, the identification number may be the "NAME" field as defined by the J1939 Network Management protocol/standard/recommended practice.

Furthermore, the table 250 also includes a leader/follower field 252. The leader/follower field 252 indicates whether the electronic component 210 is a leader or a follower in the secure vehicle network.

Additionally, the table 250 also includes an identification number following field 253 corresponding to an identification number or other identifier of another node to which the electronic component 210 is following. For example, if, after an election between the first electronic component 210 and a second electronic component (not shown) in step S600 in the method described above with reference to FIG. 1, the first electronic component 210 is not elected a leader, then the identification number following field in the table 250 may include and/or correspond to the identification number of the second electronic component.

If, however, the first electronic component 210 is elected a leader, then the identification number following field 253 may be or correspond to "NULL," or may be the identification number of the first electronic component 210; however, inventive concepts are not limited thereto.

The memory 225 of the electronic component 210 may include other fields. For example, other fields may be or include a symmetric key for secure communication, a list of addresses to which a leader leads, a symmetric key between the node and the node of the leader, and/or a public key for the network.

FIGS. 3(a)-3(g) are illustrations of intra-vehicle secure vehicle networks, according to example embodiments.

Referring to FIG. 3(a), a plurality of nodes 301, 302, 303, 304, 305, 306, 307 are within a vehicle 300. Each node corresponds to an electronic component. Each of the plurality of nodes 301, 302, 303, 304, 305, 306, 307 includes the memory 225 described above with reference to FIG. 2.

There will be some method of physical communication between each of the plurality of nodes 301, 302, 303, 304, 305, 306, 307. For example, each of the plurality of nodes 301, 302, 303, 304, 305, 306, 307 may be able to broadcast and communicate to others of the plurality of nodes 301, 302, 303, 304, 305, 306, 307 over a CAN bus, such as the communication bus 270 described above with reference to FIG. 2, or over some wireless communication; however, inventive concepts are not limited thereto.

The state of the vehicle 300 illustrated in FIG. 3(a) corresponds to a state in which each of the plurality of nodes 301, 302, 303, 304, 305, 306, 307 has been reset or woken up.

Upon each of the plurality of nodes 301, 302, 303, 304, 305, 306, 307 being reset (or woken up), each of the plurality of nodes 301, 302, 303, 304, 305, 306, 307 may have a value corresponding to "leader" in the field corresponding to the leader/follower field 252 shown in FIG. 2.

Each of, or at least some of, the plurality of nodes 301, 302, 303, 304, 305, 306, 307, will broadcast or send out a message along a communication channel such as the communication bus 270, requesting other nodes to join in creating a secure vehicle network. For example, each of the nodes 301, 302, 303, 304, 305, 306, and 307 can broadcast a message over a CAN bus; the message may include a message stating that they wish to join a network. Some vehicles may greatly benefit from parallelism, for example if nodes are limited by computational resources and/or other operations cannot be, or cannot easily, be done in parallel.

A CAN bus allows only one node to send a message at any time. For example, a vehicle with a CAN bus may have one or more pairs of nodes executing verifications on embedded security hardware in parallel with a pair of nodes communicating back and forth over a CAN bus.

Each node with a value corresponding to "leader" in the leader/follower field 252 that has broadcast a message stating a desire to join a secure vehicle network attempts to pair up with another node with a value corresponding to "leader" in the leader/follower field 252 that has also broadcast a message stating a desire to join a secure vehicle network. For example, as illustrated in FIG. 3, nodes 301 and 302 communicate a desire to join; similarly, nodes 303 and 304, and nodes 306 and 307.

Each node may establish a secure network with the first node that is available to do so. Upon agreeing to join to another node with a value corresponding to "leader" in the leader/follower field 252, nodes may not send other messages requesting to pair up with another node, and instead may engage in an election to determine a leader and a follower, after pairing. Alternatively, a node may indicate a desire to pair with a specific other node chosen from the address claim process as in the J1939 protocol, in which case the nodes may not broadcast. However, inventive concepts are not limited thereto.

For example, nodes 301 and 302 may pair up because nodes 301 and 302 were the first to respond to each other's broadcast message; nodes 303 and 304 may pair up because nodes 303 and 304 were the first to respond to each other's broadcast message; and nodes 306 and 307 may pair up because nodes 306 and 307 were the first to respond to each other's broadcast message. However, node 305 may not yet be able to pair up. Further, nodes may have a desire to pair up to specific other nodes; for example, an engine controller may attempt to pair with a transmission controller.

For example, on a J1939 CAN bus, there are two kinds of message targets: broadcast and point-to-point. A first node, e.g. node 301, may broadcast a "want to join" message over the CAN bus, and a second node, e.g. node 302, may send a point-to-point message to node 301 agreeing to join.

Alternatively, a preferred node may request joining the networks as well. For example, an engine controller may prefer to join secure networks with a transmission controller. Such electronic components may know to do this based on the J1939 address claims where nodes broadcast an address claimed message (PGN) containing "NAME" message.

FIG. 3(*b*) is an illustration of a vehicle 300, according to an example embodiment.

Referring to FIG. 3(*b*), each pair of the plurality of nodes may engage in an election to determine which element will remain a leader, and which element will change the leader/follower field 252 to correspond to "follower."

Determining which node is a leader and which node is a follower may be performed through any method. For example, the leader may be determined as the node with the lower identification number 251, or with the lower hash, such as the lower SHA256 hash, of the identification number 251. Thus, any node may be the leader of the secure network, unless otherwise restricted by a specific implementation. Thus, even if nodes within the secure vehicle network may change, a leader may not change.

Upon determination of the leader, the node that was not determined to be a leader will change the leader/follower field 252 to a value corresponding to "follower," and will change the identification number following field 253 to a value corresponding to the identification number of the node that was determined to be leader.

As an illustration, suppose nodes 301 and 302 agree to join in a secure network. Nodes 301 and 302 compare their respective identification numbers 251. Suppose node 301 has a lower identification number than node 302. Suppose, accordingly, node 301 is determined to be the leader. Node 301 will maintain a value corresponding to "leader" in the leader/follower field 252; node 302 will change the respective leader/follower field to correspond to "follower," and will change the identification number following field 253 to correspond to the identification number of node 301.

Similarly, as illustrated in FIG. 3(*b*), nodes 303 and 304 engage in a communication to determine that node 304 is a leader with node 303 following. Nodes 306 and 307 engage in a communication to determine that node 306 is a leader.

Further, nodes within the network that have a value corresponding to "leader" in the leader/follower field 252 may broadcast another message to determine other nodes that have a value corresponding to "leader" in the leader/follower field 252.

For example, as illustrated in FIG. 3(*b*), nodes 301 and 304 can broadcast a desire to communicate and join in a secure network. Likewise, nodes 305 and 306 may broadcast a desire to communicate and join in a secure network.

Some implementations may rely on, or include, some counter to help manage some steps. For example, according to some example embodiments, some method of synchronizing the pairing of nodes may be achieved with a counter, thus creating a concept of a round, or round robin. For example, a round may allow nodes to organize pairing to minimize or reduce the total number of rounds to establish the secure vehicle network.

FIG. 3(*c*) is an illustration of a vehicle 300, according to an example embodiment.

Referring to FIG. 3(*c*), nodes 304 and 305 have a value corresponding to "leader" in the leader/follower field 252. Furthermore, nodes 301, 302, 303, 306, and 307 have a value corresponding to "follower" in the leader/follower field 252. Still further, node 302 has the identification number 251 of node 301 in the identification number following field 253; nodes 301 and 303 have the identification number 251 of node 304 in the respective identification number following field 253; node 307 has the identification number 251 of node 306 in the identification number following field 253; and node 306 has the identification number 251 of node 305 in the identification number following field 253.

Nodes 304 and 305, which have a value corresponding to "leader" in the respective leader/follower field 252, may communicate a message to join and pair up.

FIG. 3(*d*) is an illustration of a vehicle 300, according to an example embodiment.

Referring to FIG. 3(*d*), upon pairing of nodes 304 and 305, node 305 will be elected as a leader while node 305 will be the follower. Thus, node 304 may have a value corresponding to "leader" in the leader/follower field 252, while node 305 may have a value corresponding to "follower" in the leader/follower field 252. Further, node 305 may have a value corresponding to the identification number of the leader node 304 in the identification number following field 253.

Figure 3D:
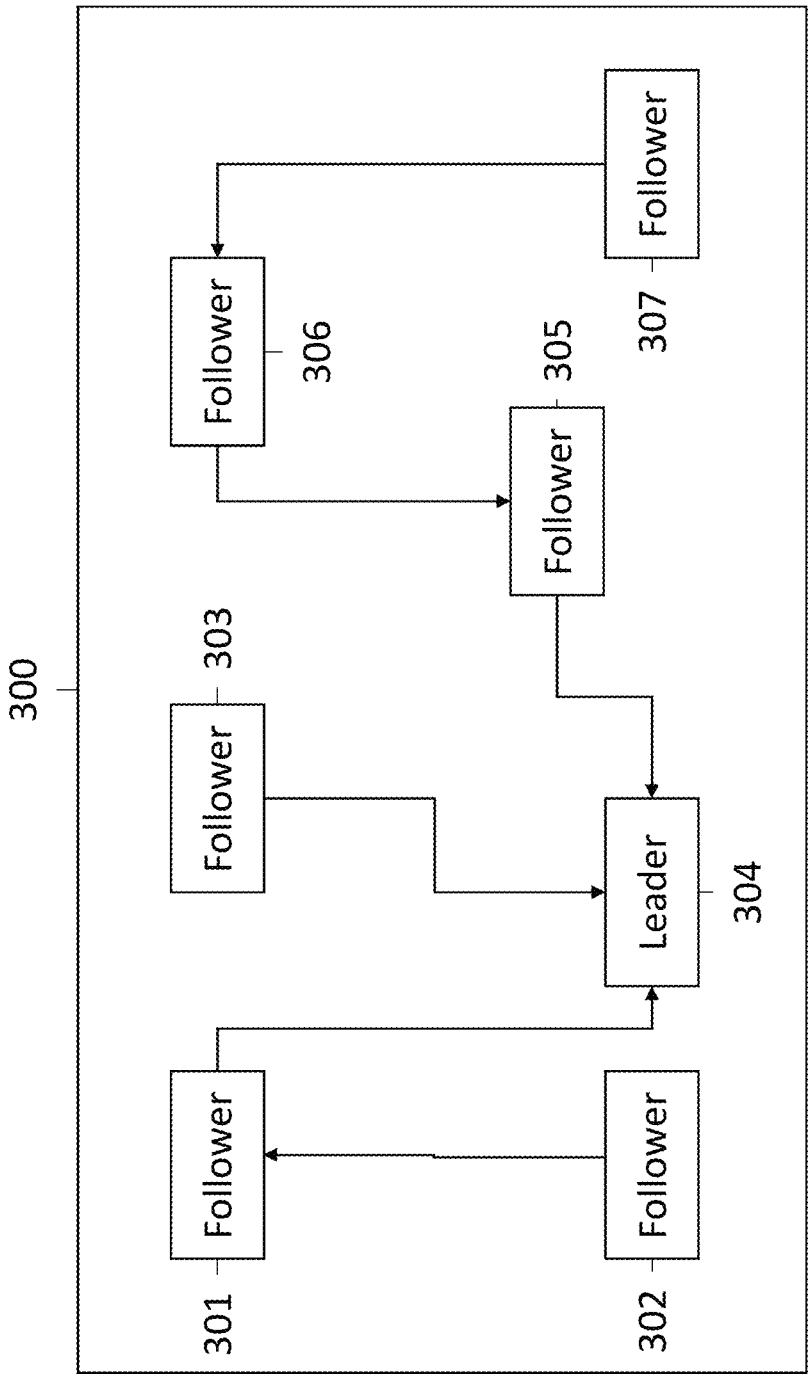

Thus, the state of the vehicle 300, as illustrated in FIG. 3(d), will correspond to a data structure such as a tree. The root of the tree corresponds to node 304 while internal nodes of the tree may correspond to nodes 301, 305, and 306, while leaves of the tree correspond to nodes 302, 303, and 307.

Figure 3E:
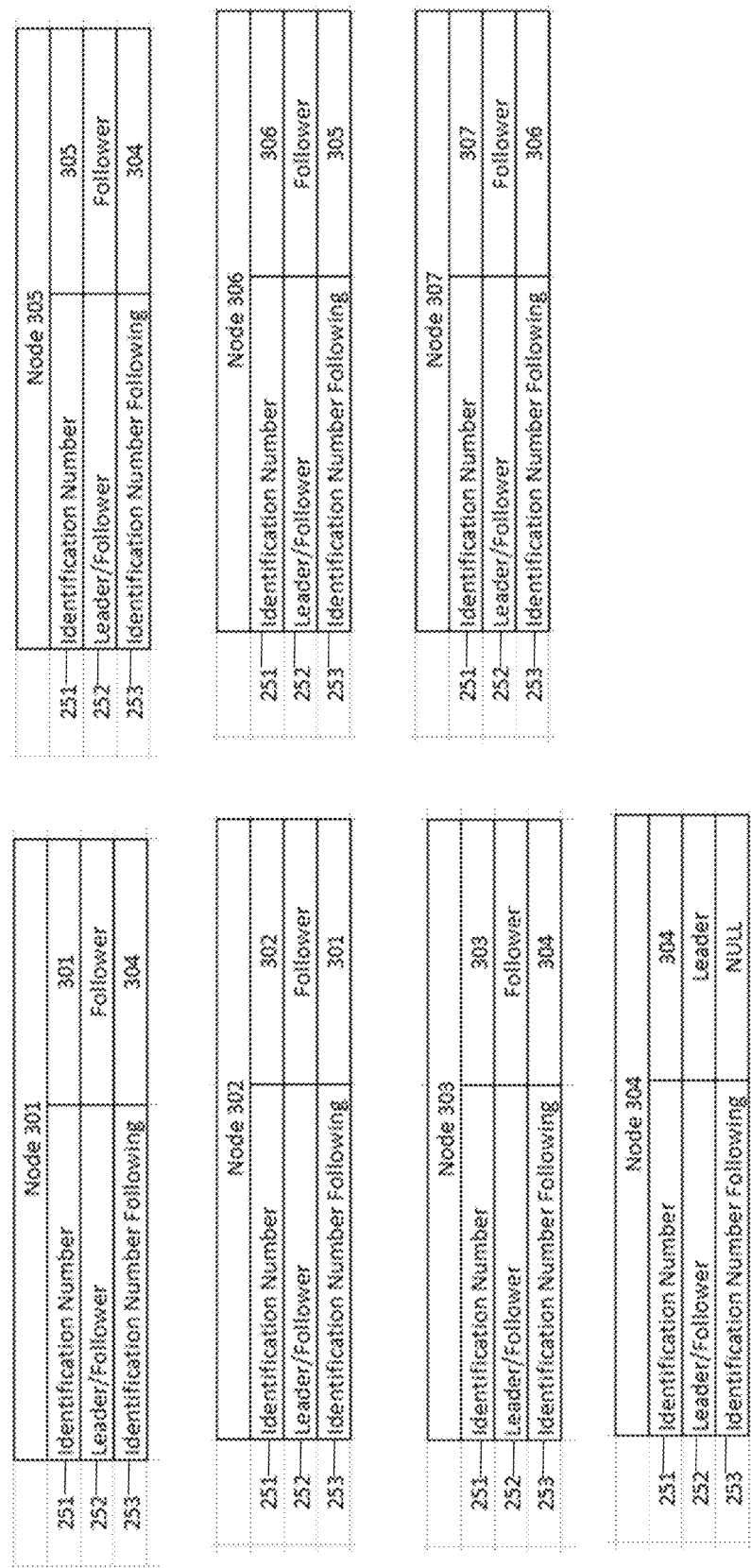

FIG. 3(e) is an illustration of the contents of the memory 225 of each node in the secure vehicle network illustrated in FIG. 3(d), according to an example embodiment.

Referring to FIG. 3(e), each of nodes 301, 302, 303, 304, 305, 306, and 307 has a memory 225. The memory 225 includes a table with fields as shown.

For example, as illustrated in FIG. 3(e), node 301 may have a value corresponding to "304" in the identification number following field 253. Likewise, node 304 may have a value of "NULL" in the identification number following field. Alternatively, node 304 may have a value corresponding to the identification number corresponding to node 304 in the identification number following field 253. For example, node 304 may have a self-referential identification number following field 253.

Figure 3F:
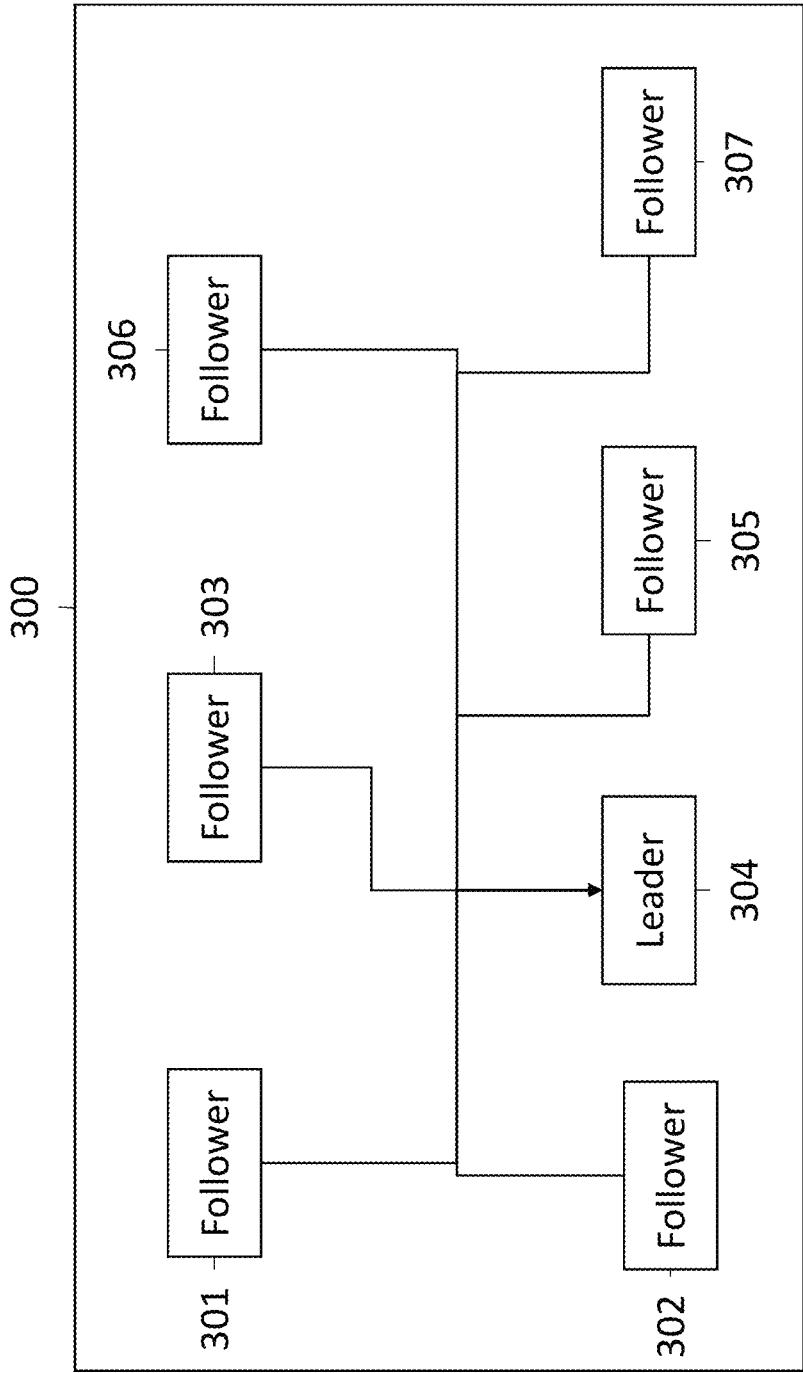

FIG. 3(f) is an illustration of a vehicle 300, according to an example embodiment.

Comparing FIG. 3(f) to FIG. 3(d), the logical network topology is different. Further steps can be performed by nodes in the vehicle network to restructure the network topology to a more efficient topology. There may be a communication between follower nodes to change the identification number following field 253. For example, a node, e.g. node 305, with a follower in the leader/follower field 252, may broadcast a message corresponding to the respective identification number following field 253. All nodes that follow node 305, e.g. nodes 306 and 307, may update their respective identification number following field 253 to correspond to those of node 305. Thus, the network topology may change. The vehicle network illustrated in FIG. 3(f) may simplify or speed up some operations, as compared to the vehicle network illustrated in FIG. 3(d). A message from the leader to followers to change topology should be secure. For example, the current leader may tell all internal nodes and leaf nodes to change topology. Further, a network leader may broadcast a proof of leadership.

Figure 3G:
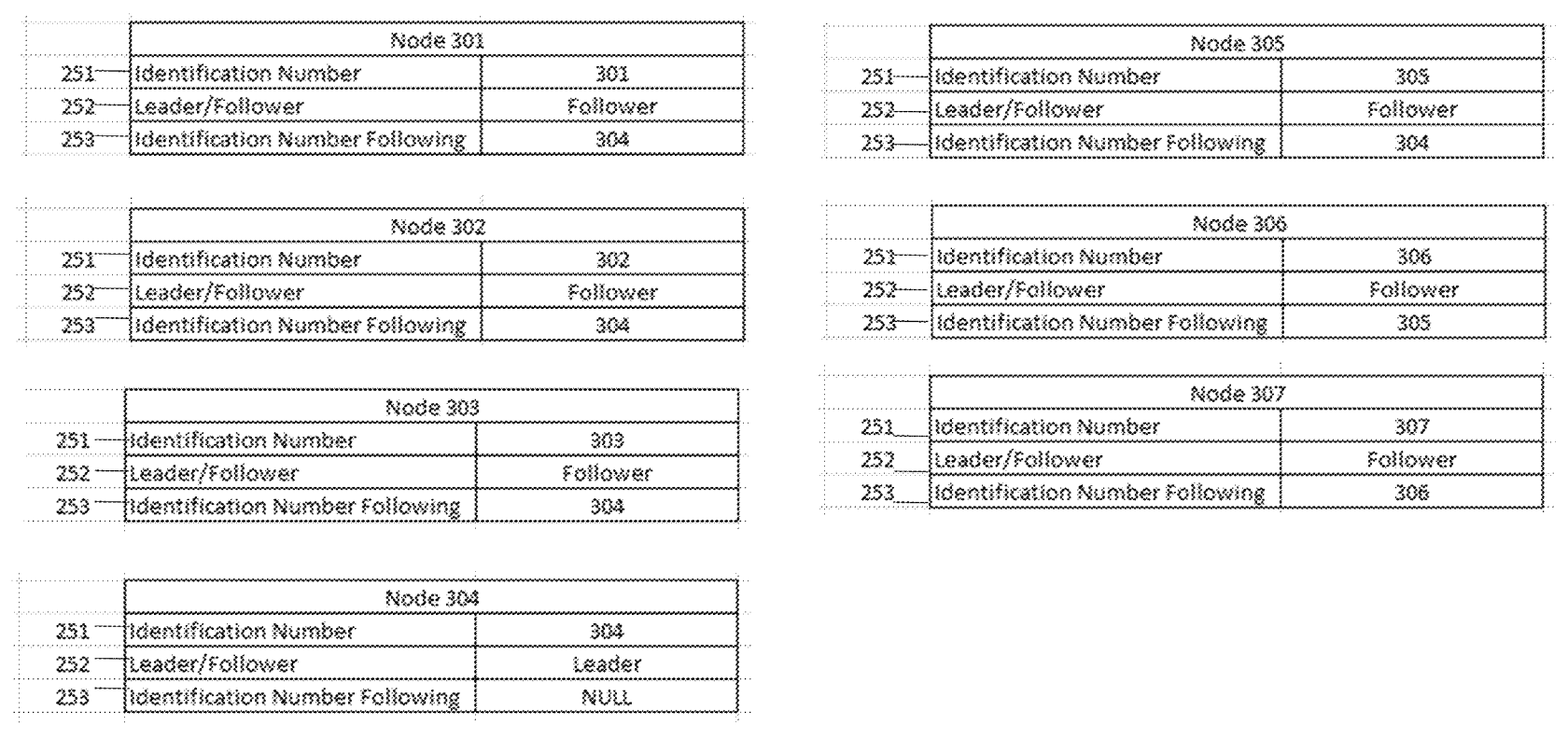

Similar to FIG. 3(e), FIG. 3(g) illustrates that node 304 has a value corresponding to "leader" in the leader/follower field 252. However, nodes 301, 302, 303, 305, 306, and 307 all have the identification number corresponding to node 304 in the identification number following field 253. This corresponds to such a restructuring of the network topology.

FIG. 3(g) is an illustration of the contents of the memory 225 of each node of FIG. 3(f), according to an example embodiment.

Referring to FIG. 3(g), the contents of the memory 225 of each node are similar to those illustrated in FIG. 3(e). However, because each follower node illustrated in FIG. 3(e) directly follows node 304, the contents of each follower node's identification number following field 253 contains, or corresponds to, the identification number corresponding to leader node 304.

As illustrated in FIGS. 3(e) and 3(g), leader node 304 may also be a network leader node. Such a network leader node does not delegate the action to join other secure networks.

Such a network leader node may securely distribute a shared key to nodes in the secure network for securely communicating with other nodes on the vehicle network. For example, the network leader node 304 in FIG. 3 might distribute a shared secure CAN bus key for broadcasting messages that may be verified by recipient nodes to detect for potential message tampering.

Inventive concepts are not limited to pairing network leaders. For example, according to some example embodiments, a third node may be required, for example as required by the network topology.

Furthermore, example embodiments may contain gateway nodes that are connected to multiple vehicle networks. According to example embodiments, such a gateway node might treat the secure networks independently, for example, the node might be a leader on one secure network and a follower on another.

Example embodiments are not limited to the above network topologies. For example, other network topologies may include a binary tree. Such a binary tree may be implemented with a version of a round robin protocol.

According to some example embodiments, a remote node, that is, a node not on the vehicle, may be required to cross-verify during the pairing of secure networks. For example, the vehicle 300 may require communication with a remote internet server (not shown).

For instance, consider an anhydrous ammonia applicator implement with a control valve controlled by an attached tractor. To prevent tampering in response to a terrorist action, a tractor leader node might require a trusted remote computer to also verify the implement leader node or vise-versa as a precondition to opening the control value.

Furthermore, an example embodiment may have nodes with a cached state from prior verification sequences. For example, previously verified certificates could be stored in a compact form or in a way which is faster to verify.

Figure 4A:
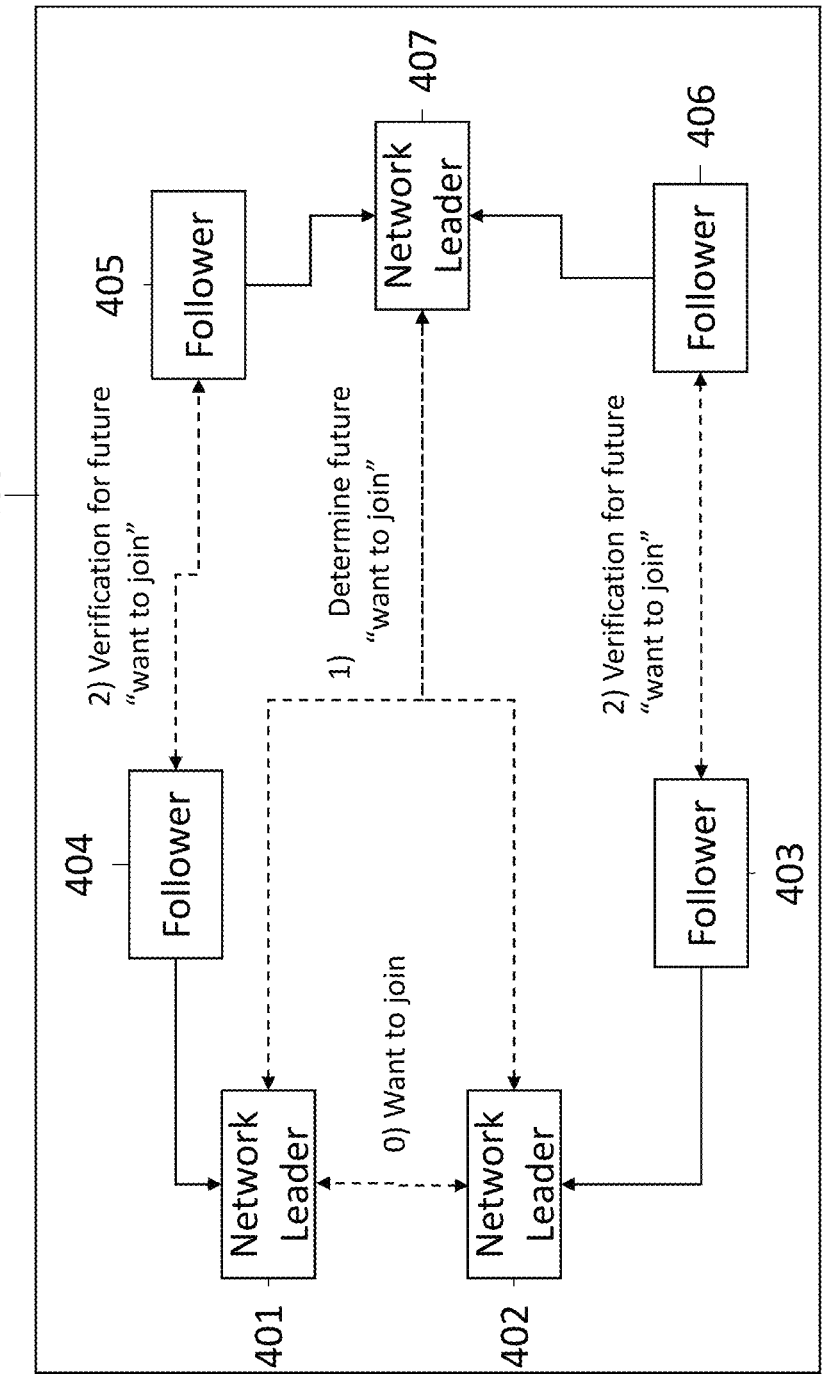
FIGS. 4(a)-4(b) are representative drawings illustrating the establishment of secure vehicle networks on a vehicle for intra-vehicle communication, according to some example embodiments.

FIG. 4(a) is an illustration of a vehicle 400, according to some example embodiments.

According to some example embodiments, network leader nodes may delegate verification to one or more follower nodes.

As illustrated in FIG. 4(a), network leader nodes 401, 402, and 406 had previously established a shared key with their respective follower nodes. Network leader nodes 401, 402, and 407 might use the secure key to securely communicate to follower nodes to enable the follower nodes to perform verifications. If two network leader nodes, for example network leader nodes 401 and 402, are determined where follower nodes have made progress on verifying the other network leader node, for example node 406, the time to establish a secure vehicle network may be reduced. For example, if vehicle verification computation resources were constrained, such a time may be reduced.

As shown in FIG. 4(a), the non-pairing network leader node 407 has enough follower nodes 405 and 406 to ensure follower nodes will have made progress verifying the eventual new network leader node of the pairing nodes. This may be coordinated intentionally.

Figure 4B:
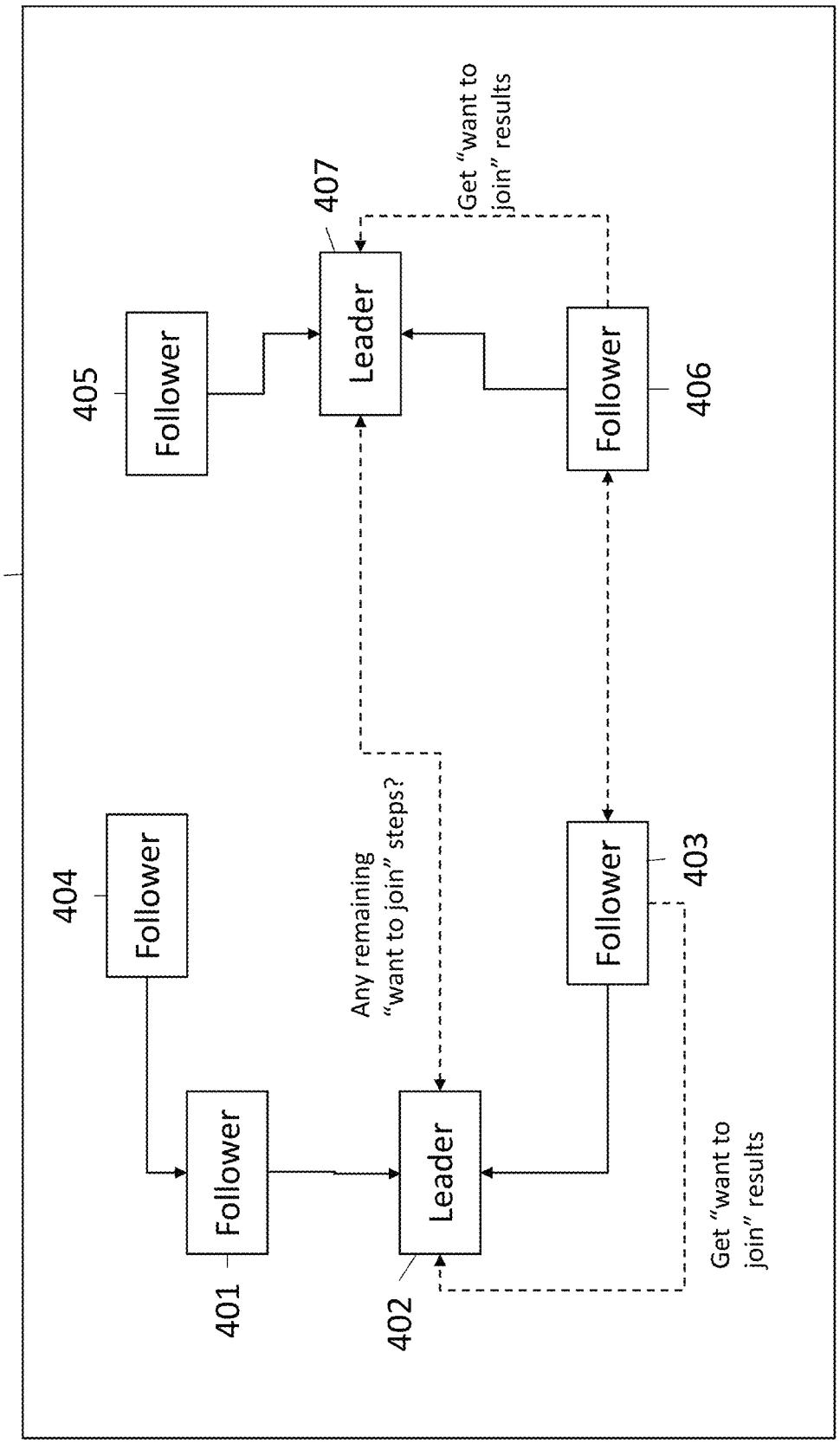

FIG. 4(b) illustrates a subsequent secure network pairing wherein each network leader node 402, 407 retrieves a verification from a follower node. The time to establish the secure network in FIGS. 4(a) and 4(b) may therefore be reduced even if the follower nodes merely had not yet fully completed the verification ahead of time.

Figure 5:
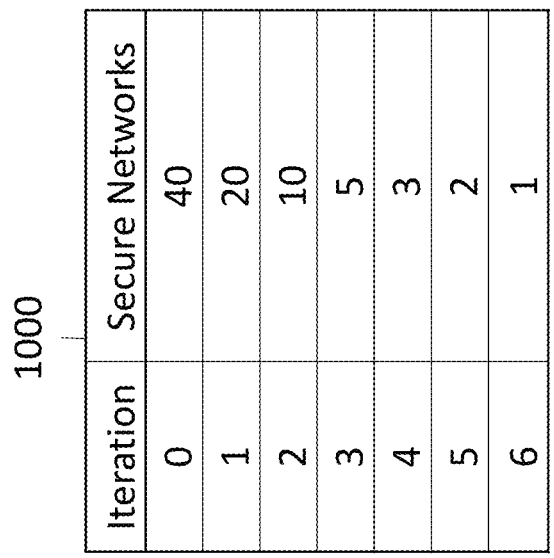

FIG. 5 illustrates a number of iterations needed to establish a secure network, according to some example embodiments.

As an example, consider a vehicle, such as the vehicle 300 illustrated above, that has a plurality of electronic components, such as the electronic component 210. Each such electronic component follows the method illustrated in FIG. 1 to establish a vehicle network, consolidating nodes with each iteration.

Each node within the vehicle network executes such a method illustrated in FIG. 1 in parallel. Accordingly, each such execution of the method illustrated in FIG. 1 might approximately double the size of an individual network, and reduce the number of networks in half for each such iteration. Thus, given N individual nodes (where N is a natural number), the time taken to securely define a network may be $O(\log(N))$.

In contrast, if instead every node is required to communicate with all nodes to verify all other nodes before establishing a secure network, such a secure network might take approximately $O(N^2)$ time to verify the security. Thus, $O(N^2)$ time may be detrimental if, for example, the time to compute the verification were the limiting factor of establishing the security for the network. Further, some nodes may not have enough memory to store verification information for all nodes, and may exclude some nodes from otherwise participating in the secure network or causing verification information to be redundantly transmitted on the vehicle network while establishing the secure network. If the vehicle network were on a CAN bus, redundant messages sent in series would exacerbate the time required to establish the secure vehicle network.

Figure 6A:
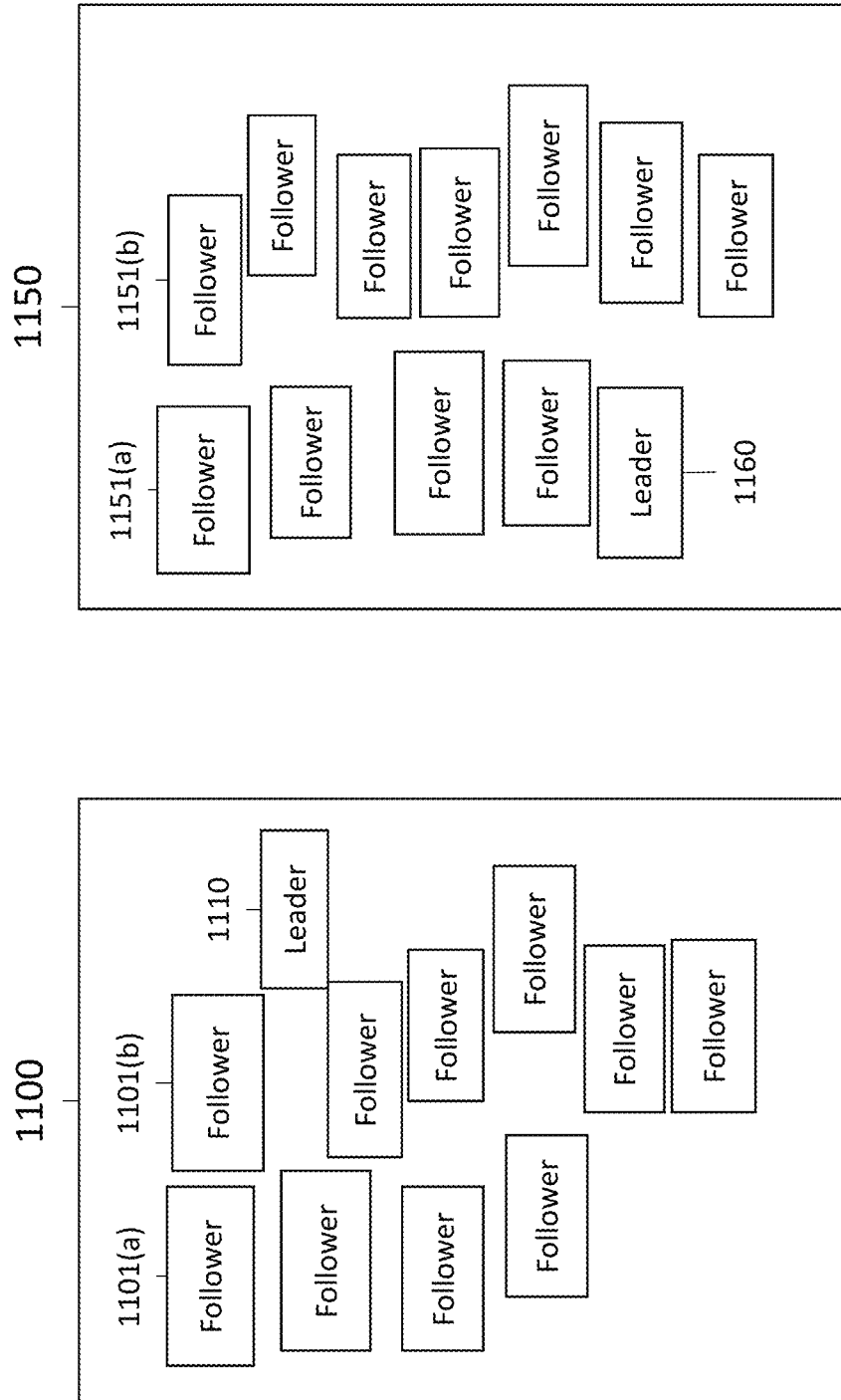
Figure 6C:
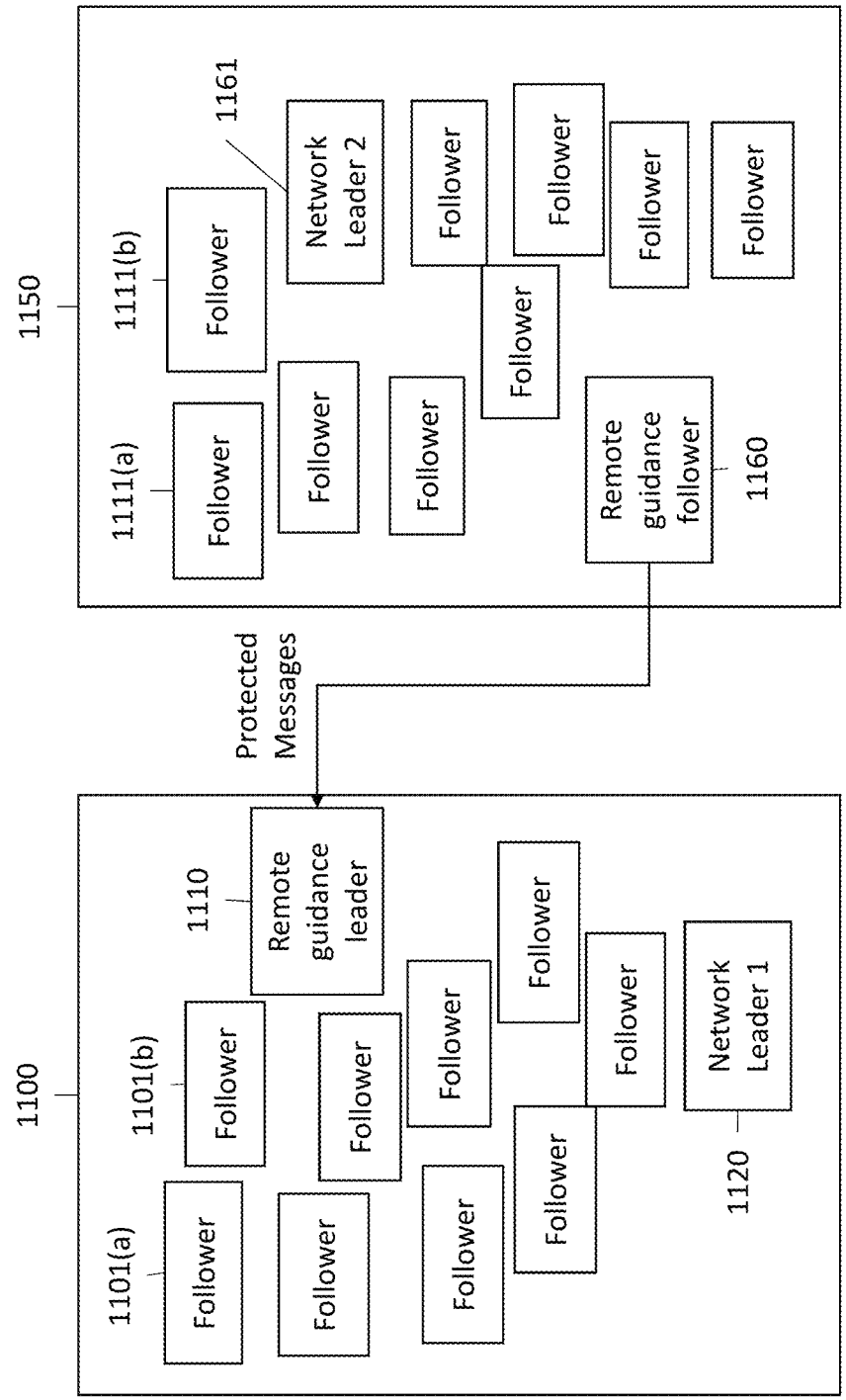

FIGS. 6(a)-6(c) illustrates secure inter-vehicle networks, according to example embodiments. Example embodiments may be advantageous for a vehicle to form a secure vehicle network with multiple other vehicles, or with different vehicles over time.

In the context of FIGS. 6(a)-6(c), a leader may correspond to a lead vehicle that establishes a lead guidance path, and a follower may correspond to vehicle or vehicles track or generally follow the lead vehicle guidance path. The path may include offsets in one or more dimensions, such as: (1) lateral offset to allow for cultivating, tilling, leveling, earthmoving, planting, spraying, harvesting, treating, or processing of crop or ground. in adjacent or row-skipping operations and (2) longitudinal offset in the direction of travel of one or more vehicles for collision avoidance, clearance during turning operations, and a delay or lag for tracking/guidance of the follower vehicle or vehicles to track the lead vehicle.

Additionally in the context of FIGS. 6(a)-6(c), during operations in the field or worksite, the follower vehicle or lead vehicle may switch roles or reverse roles for efficiency or other reasons, such as resetting or re-establishing of a secure network after expiration of a timer or within a certain geographical zone, defined by a series of coordinates. An operator (not shown) may force the lead vehicle to be a lead vehicle within a certain zone, field or worksite, such as a vehicle that a foreman or project lead directs for a particular project; this lead vehicle may be transitioned at the end of a work shift or to bring a vehicle offline for service or maintenance or to reallocate a lead vehicle to another worksite or area.

Referring to FIG. 6(a), two vehicles might form a secure inter-vehicle network with each other. A first vehicle might be an agricultural combine 1100 and a second vehicle might be a tractor with a grain cart 1150; however, inventive concepts are not limited thereto.

The combine 1100 includes a plurality of electronic components/nodes 1101(a), 1101(b), . . . 1110 that have formed a secure vehicle network, according to the methods described above. Node 1110 is a leader or a network leader, with the other nodes 1101(a), 1101(b), . . . being followers.

Similarly, the tractor with grain cart 1150 may include a plurality of electronic components/nodes 1151(a), 1151(b), . . . 1160 that have formed a secure vehicle network, according to the methods described above. Node 1160 is a leader or a network leader with other nodes 1151(a), 1151(b), . . . being followers.

Supposing that the agricultural combine 1100 sends data wirelessly to the tractor with grain cart 1150, such that the tractor with grain cart 1150 attempts to drive in tandem with the combine 1100 so that the combine 1100 can transfer material to the tractor with grain cart 1150. To accomplish this, the agricultural combine 1100 might use the methods described in FIG. 1 to form a secure network with the tractor with grain cart 1150. Further, the combine 1100 and the tractor with grain cart 1150 might establish a secure communication between each other.

FIG. 6(b) illustrates a state of an inter-secure vehicle network, according to example embodiments.

As shown in FIG. 6(b), protected messages may be sent between leader node 1110 and network leader node 1160. For example, the combine 1100 may encrypt and add a message authentication (MAC) for each of the tractor with grain cart 1150's messages. Accordingly, owing to the encryption, the only entity that can see the decrypted data may be the tractor with grain cart 1150. Further, owing to the MAC, the tractor with grain cart 1150 can verify if messages received are from the combine 1100, and act on them accordingly.

There may not be a prevention of any denial of service (DOS), and further there may not be protection over other exploits such as stack overflow. But, assuming if the network's verification is cryptographically strong, example embodiments would be able to detect untrusted identities and choose not to establish secure vehicle networks with those entities. Nodes should not establish keys for authentication or confidentiality with entities other than those with which they have established a secure vehicle network.

Further, according to some example embodiments, vehicles may identify properties of the other vehicle's nodes. Some properties might include the vehicle type, permissions, features, limitations, etc.; however, example embodiments are not limited thereto.

Some secure vehicle networks may choose to reorganize the node topology to facility a better leader node when forming a secure vehicle network for inter-vehicle communication.

FIG. 6(c) illustrates an inter-vehicle communication network, according to an example embodiment.

As illustrated in FIG. 6(c), one node, e.g. node 1120, of the combine 1100 is capable of remote, e.g. wireless, communication with other vehicles.

Further, another node, e.g. node 1161, of the tractor with grain cart 1150. Even though the network leader of the combine 1100 may be node 1120, while the network leader of the tractor with grain cart 1150 may be node 1161, node 1110 may be the remote guidance leader while node 1160 may be the remote guidance follower. The remote guidance leader will inform the remote guidance follower how to drive/travel.

As a non-limiting example embodiment, the combine 1100 and the tractor with grain cart 1150 establish a secure vehicle network, and use digital certificates to verify each vehicle's network leader node. However, in addition to the secure vehicle network for intra-vehicle communications established in the combine 1100, and the secure vehicle network for intra-vehicle communications established in the tractor with grain cart 1150, there can be another gateway communication for inter-vehicle communications established between the combine 1100 and the tractor with grain cart 1150.

As a non-limiting example embodiment, consider the tractor with grain cart 1150 driving up to the combine 1100; there may be thus an inter-vehicle secure communication formed between the two vehicles. An example wherein this may be advantageous would be if the tractor with grain cart 1150 were returning from dropping off a prior load of grain.

Further, there may be a safety interlock when appropriate. For example, perhaps the operators of the combine 1100 and the tractor with grain cart 1150 must approve prior to secure vehicle network formation, for example with a prompt on respective displays on the vehicles.

Additionally, secure vehicle networks may be changed at runtime. For example, suppose a tractor forms a secure inter-vehicle network with a first implement, such as the tractor with grain cart 1150. After some time, the tractor may physically disconnect from the implement; for example, the tractor may disconnect from the grain cart because the grain cart is full. A node on the tractor which may correspond to the network leader node between the tractor and the grain cart, may detect the event, and would no longer be a leader node of the grain cart.

According to example embodiments, there may be an advantage for special nodes in the system to differ from the network leader node.

Suppose further the same tractor connects to a second implement. Establishing a secure vehicle network with the second implement may start as a new sequence of the method. Afterwards, a secure vehicle network is formed between the tractor and the second implement.

Figure 7A:
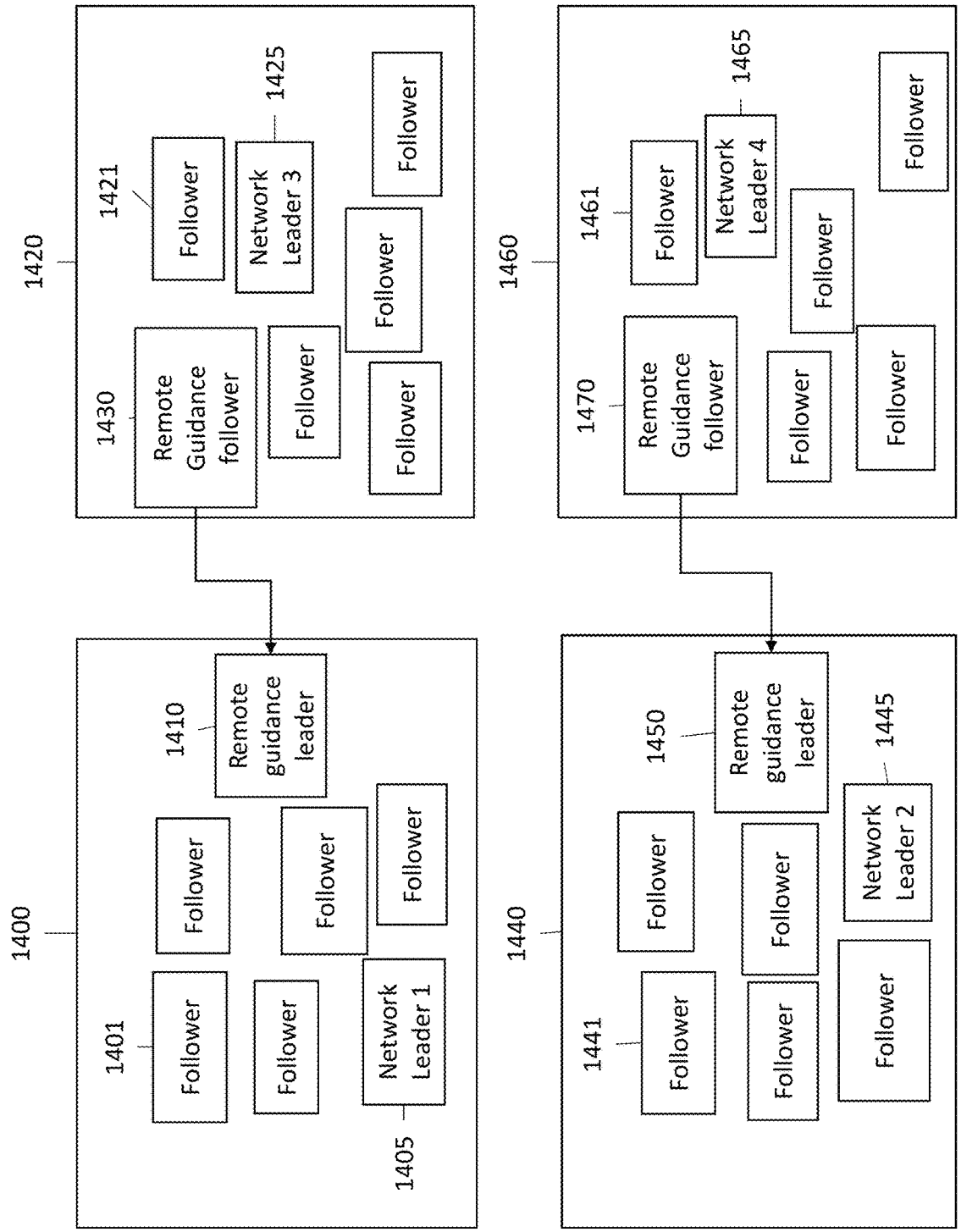

FIGS. 7(*a*) and 7(*b*) illustrate an inter-vehicle secure vehicle network amongst a plurality of vehicles and a plurality of implements.

Referring to FIG. 7(*a*), a first combine 1400 may have a plurality of follower nodes 1401, a network leader node 1405, and a remote guidance leader 1410. A first grain cart 1420 may have a plurality of follower nodes 1421, a network leader node 1425, and a remote guidance follower 1430. A second combine 1440 may have a plurality of follower nodes 1441, a network leader node 1445, and a remote guidance leader 1450. A second grain cart 1460 may have a plurality of follower nodes 1461, a network leader node 1465, and a remote guidance follower 1470.

Suppose combine 1400 is not physically connected, e.g. connected over a CAN bus, with grain cart 1460. Similarly, suppose combine 1440 is not physically connected, e.g. connected over a CAN bus, with grain cart 1420.

However, there may be a secure communication between the first grain cart 1420 and the first combine 1400. Similarly, there may be a secure communication between the second grain cart 1460 and the second combine 1440.

Referring to FIG. 7(*b*), suppose after some time grain cart 1420 is full and needs to unload the grain. According to some example embodiments, there may be coordination in disconnecting, for example by a request from either the combine 1400 or the grain cart 1420.

Referring to FIG. 7(*b*), in an example embodiment the first combine 1400 and the first grain cart 1420 may be chosen to be remote on a secure vehicle network if possible, and may establish a second vehicle network comprising the first combine 1400 and the second grain cart 1460. However, inventive concepts are not limited thereto.

According to some example embodiments, remote guidance nodes may try to maintain a secure vehicle network with multiple other vehicles if possible. For example, each combine may try to maintain a secure vehicle network with each grain cart, and vice versa. Similarly, each vehicle may try to maintain a secure vehicle network with every other vehicle.

According to some example embodiments, there may be a detection, or a detection and a verification, of the first grain cart 1420 physically out of the way before the second grain cart 1460 takes the place of the first grain cart 1420.

Alternatively or additionally, there may be a safety interlock, e.g. an operator confirmation.

According to some example embodiments, a secure vehicle network may automate a transition from the first grain cart 1420's departure and the second grain cart's 1460 arrival. For example, there may be a synchronous departure.

According to some example embodiments, the first grain cart 1420 may return, having unloaded the grain. The first grain cart 1420 may try to establish a secure vehicle network with one or more vehicles in the system. The first grain cart may have been kept in a cache in components of the secure vehicle networks while the first grain cart 1420 was away unloading grain. For example, a key previously established between the first grain cart 1420 and other vehicles may still be valid and reused, rather than using the method described in FIG. 1 to reestablish the secure vehicle network.

Figure 8:
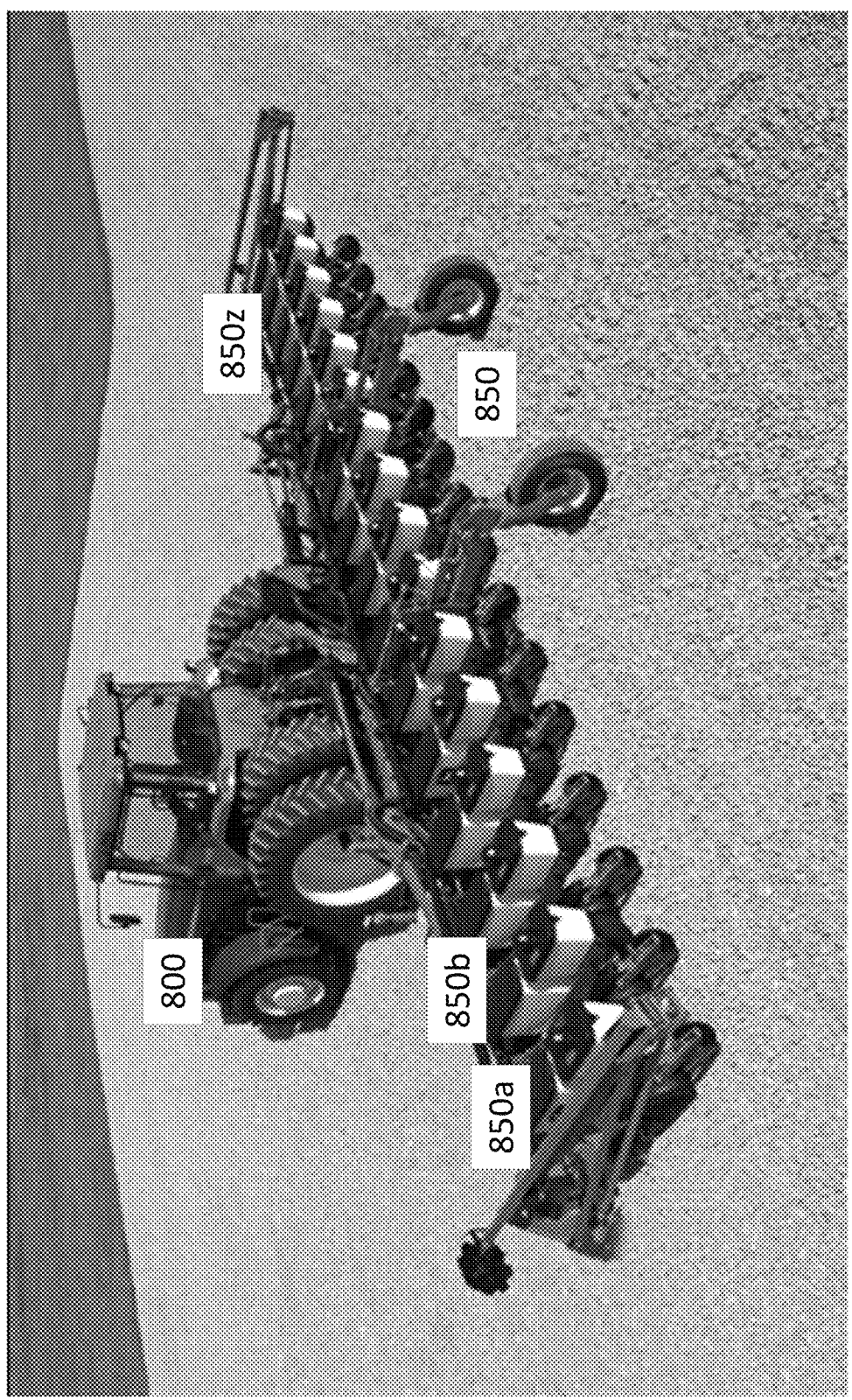

FIG. 8 shows example agricultural vehicles according to an example embodiment.

As shown in FIG. 8, a tractor 800 may drive a planter 850. The planter 850 may include a plurality of rows 850*a*, 850*b*, 850*z*.

The tractor 800 may include a plurality of electronic components. Each of the plurality of rows 850*a*, 850*b*, 850*z* may include one of, or a plurality of electronic components.

The plurality of electronic components included in the plurality of rows 850*a*, 850*b*, 850*z* may engage in the method illustrated in FIG. 1 to establish an intra-vehicle secure network. After establishing the vehicle secure network, one of the plurality of electronic components included in the plurality of rows 850*a*, 850*b*, 850*z* may have a value corresponding to "leader" in the leader/follower field, while the other of the plurality of electronic components included in the plurality of rows 850*a*, 850*b*, 850*z* may have a value corresponding to "follower" in the leader/follower field.

The tractor 800 and the planter 850 may engage in the methods illustrated in FIGS. 6(*a*)-7(*b*) to communicate in an inter-vehicle secure network.

One of the plurality of electronic components included in the tractor 800 may communicate with one of the plurality of electronic components included in the planter 850, informing the planter of the speed of the tractor.

The electronic component included in the planter 850 that receives communication from the tractor 800 may broadcast the speed of the tractor to other electronic components included in the planter 850, to inform the rows 850*a*, 850*b*, 850*z* of the planter 850 how fast to dispense seed.

Figure 9:
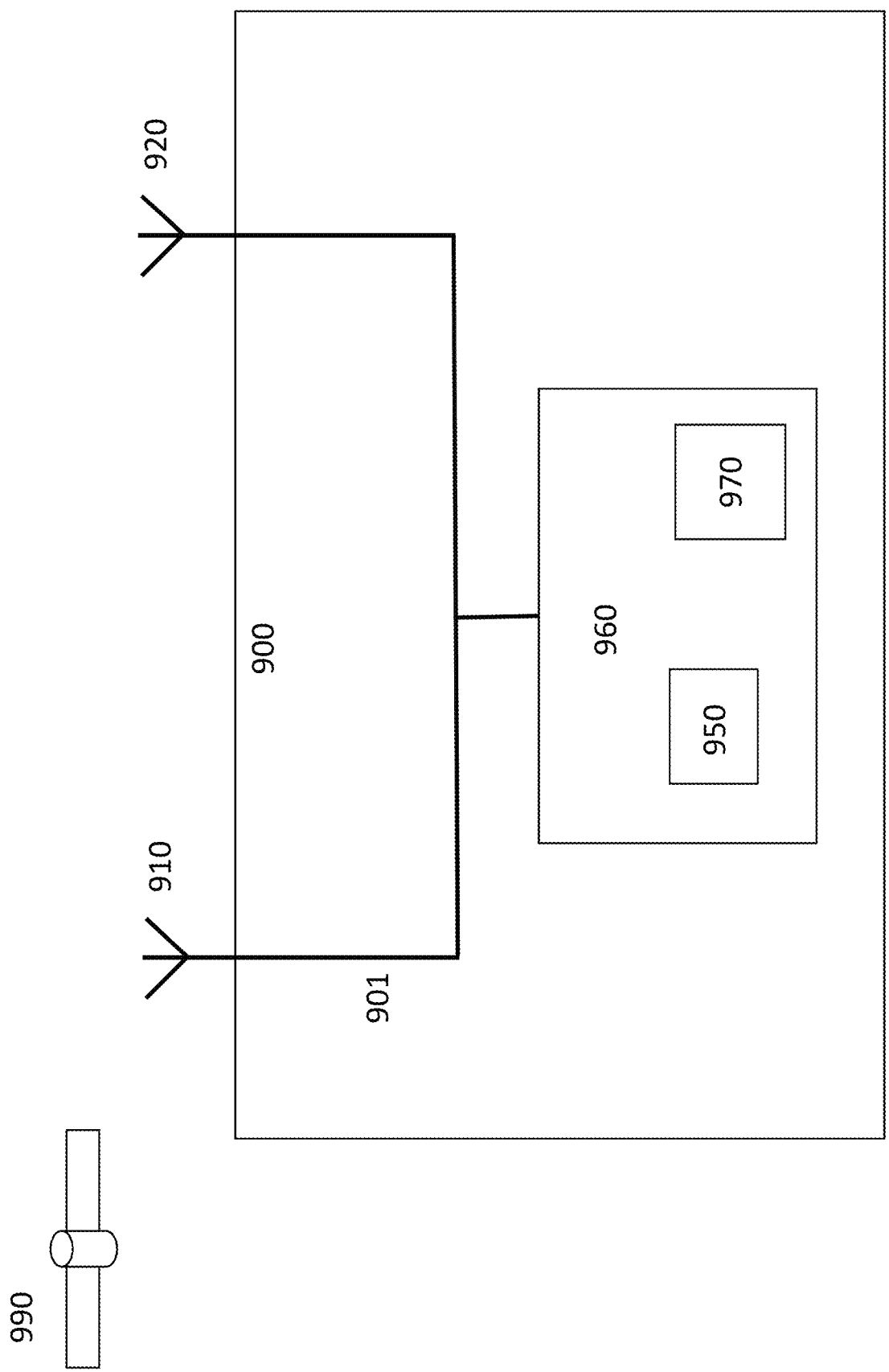

FIG. 9 is a representative drawing illustrating a system including a satellite and a vehicle, according to some example embodiments, according to some example embodiments.

As illustrated in FIG. 9, a vehicle 900 may include a location-determining receiver 910, a wireless transceiver 920, and a data processing system 960 including a path planner 950 and a guidance-tracker 970. The location-determining receiver 910, the wireless transceiver 920, and the data processing system 960 may be connected over a bus 901. The vehicle 900 may correspond to one or more of the vehicles as described with regards to FIGS. 7(*a*)-7(*b*).

The location-determining receiver 910 may receive location information from a satellite 990. The location-determining receiver 910 may be or correspond to a satellite navigation receiver, such as a Global Navigation Satellite System (GNSS) receiver. The location information received from the satellite 990 may include at least one of position, velocity and heading data for the vehicle 900. The location-determining receiver 910 may also receive altitude information including at least one of roll angle, tilt angle, and yaw angle (heading) of the vehicle 900.The wireless transceiver 920 may enable communication with other vehicles in the vehicle secure network. For example, the vehicle 900 may correspond to the combine 1400 described above with reference to FIG. 7(*a*), and may communicate over the wireless transceiver 920 with another vehicle, such as grain cart 1420, described above with reference to FIG. 7(*a*), so as to coordinate respective guidance paths.

If the vehicle 900 is designated a leader, the vehicle 900 may track a lead path plan, whereas other follower vehicles may track a follower path plan. The follower path plan may be a derivative of the lead path plan.

The data processing system 960 may include one or more processors configured to execute machine-readable instructions that, when executed, cause the one or more processors to perform various actions. In some non-limiting example embodiments, the data processing system 960 may include the path planner 950 and the guidance tracker 970. The path planner 950 and the guidance tracker 970 may be embodied as hardware and/or software that, when executed by the one or more processors, cause the processor to perform various actions.

For example, the path planner 950 may determine the path plan, based on inputs received from the location-determining receiver 910. The guidance tracker 970 may track a path taken by the vehicle 900 in response to information received from the location-determining transceiver 910.

The data processing system may receive information from, and transmit information through, the wireless transceiver 920. For example, if the vehicle 900 corresponds to the combine 1400, then the vehicle 900 may communicate with the grain cart 1420 to track set and track paths.

Systems and methods for establishing a secure vehicle network according to example embodiments may be performed with reduced or minimized speed. Further, a number of independent verifications may be reduced or minimized while nodes perform verifications in parallel. Further, redundant vehicle messages may be reduced or minimized. Still further, the systems and methods are robust to situations when a vehicle, or components within a vehicle, are reset.

Example embodiments being thus described, it will be obvious that the same may be varied in many ways. Such variations are not to be regarded as a departure from the spirit and scope of example embodiments, and all such modifications as would be obvious to one of ordinary skill in the art are intended to be included within the scope of the claims.

What is claimed is:

1. A method of creating a secure vehicle network including a plurality of nodes, the plurality of nodes including a memory storing a leader/follower field, the method comprising:
    establishing an initial communication path from (a) a first node with a value corresponding to "leader" stored in the leader/follower field prior to the creation of the secure vehicle network to (b) a second node with a value corresponding to "leader" stored in the leader/follower field prior to the creation of the secure vehicle network, the first node having first information;
    communicating from the first node to the second node over the initial communication path to establish the secure vehicle network by (i) receiving second information from the second node, and (ii) based on the second information received from the second node, electing the first node to maintain the value corresponding to "leader" in the leader/follower field; and
    in response to the first node not being elected leader based on the second information received from the second node, assigning a value corresponding to "follower" in the leader/follower field of the first node,
    wherein the first information corresponds to a first serial number of the first node, and
    the second information corresponds to a second serial number of the second node.

2. The method of claim 1, wherein, in response to the first node not being elected leader based on the second information received from the second node, the method further comprises:
    assigning a value in an identification number following field in the memory of the first node to correspond to an identifier of the second node.

3. The method of claim 1, further comprising:
    in response to the first node being elected leader, establishing a further communication path from the first node to a third node with a value corresponding to "leader" in a leader/follower field of a memory of the third node, and communicating from the first node to the third node over the further communication path to establish the secure vehicle network by (i) receiving third information from the third node, and (ii) electing the first node to assign a value corresponding to "follower" to the leader/follower field based on the third information received from the third node.

4. The method of claim 1, wherein the electing includes, electing the first node to assign a value corresponding to "follower" to the leader/follower field based on an identifier of the first node and an identifier of the second node.

5. The method of claim 1, further comprising:
    in the first node, setting a value corresponding to "leader" in the leader/follower field in response to a reset command performed by the first node.

6. The method of claim 1, further comprising:
    in the first node, setting a value corresponding to "leader" in the leader/follower field in response to a wake-up command performed by the first node.

7. The method of claim 1, wherein the communicating from the first node to the second node includes,
    communicating over a bus.

8. The method of claim 7, wherein the establishing the initial communication path from the first node to the second node includes,
    the first node broadcasting a message over the bus, the message including a statement of a desire to join other nodes,
    and wherein the first node is configured to receive a message from the second node that is broadcast over the bus, the message including a statement of a desire to join other nodes.

9. The method of claim 1, wherein the first node of the plurality of nodes corresponds to an electronic component, and the electronic component includes at least one of a body controller, an engine controller, a transmission controller, a telematics box, a display, an on-vehicle server, a wireless communication controller, a satellite antenna, a steering controller, a window controller, an implement hitch controller, a generator/inverter, a brake controller, or a seat controller.

10. The method of claim 1, wherein the first node of the plurality of nodes corresponds to an electronic component of an agricultural vehicle, a mining vehicle, or of a construction vehicle, the agricultural vehicle including one of a tractor, combine, implement, the construction vehicle including one of a loader or an excavator.

11. The method of claim 1, further comprising changing a logical network topology of the vehicle secure network by:
selecting one of the plurality of nodes having a value corresponding to "follower" in the leader/follower field; and
assigning a value in an identification number following field of the selected node to a value corresponding to an identification number corresponding to the one of the plurality of nodes.

12. The method of claim 1, wherein the electing the first node to maintain the value corresponding to "leader" includes,
electing the first node to maintain the value in response to a comparison of a first hash value of the first serial number to a second hash value of the second serial number.

13. The method of claim 1, wherein the communicating from the first node to the second node over the communication path includes,
communicating over a Controller Area Network (CAN) bus.

14. The method of claim 1, wherein the communicating from the first node to the second node includes,
communicating according to a J1939 protocol.

15. A vehicle comprising:
at least one electronic component configured to communicate with other electronic components over a communication bus, the at least one electronic component including a memory configured to (i) store an identification number, (ii) store a leader/follower field indicating whether the electronic component is to be a leader or a follower, and (ii) store an identification number following field indicating an identification number associated with a node to which the electronic component delegates joining vehicle secure communication networks,
a node having an initial value of "leader" in the leader/follower field configured to join vehicle secure communication networks on behalf of other nodes having a value of "follower" in the leader/follower field, a value of the identification number following field in the other nodes having a value of "follower" in the leader/follower field corresponding to a value of the identification number stored in the identification number field of the node having the initial value of "leader" in the leader/follower field,
wherein the identification number of the at least one electronic component corresponds to a serial number of the at least one electronic component,
a first electronic component among the at least one electronic components having a value corresponding to "leader" in the leader/follower field is configured to initially communicate to a second electronic component among the at least one electronic components having a value corresponding to "leader" in the leader/follower field, and
the first electronic component is configured to initially communicate to the second electronic component to elect the first electronic component to change the value in the leader/follower field to "follower", and the first electronic component and the second electronic component having a vehicle secure network after initially communicating.

16. The vehicle of claim 15, wherein a first electronic component having a value corresponding to "follower" in the leader/follower field does not broadcast a message to other nodes indicating a desire to join a vehicle secure network.

* * * * *